(12) United States Patent
Soryal

(10) Patent No.: US 12,501,234 B2
(45) Date of Patent: Dec. 16, 2025

(54) MANAGEMENT OF VEHICLE DATA TRAFFIC OFFLOADING

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 545 days.

(21) Appl. No.: 18/049,377

(22) Filed: Oct. 25, 2022

(65) Prior Publication Data
US 2024/0137957 A1 Apr. 25, 2024
US 2024/0236617 A9 Jul. 11, 2024

(51) Int. Cl.
*H04W 4/02* (2018.01)
*H04W 12/06* (2021.01)

(52) U.S. Cl.
CPC .......... *H04W 4/025* (2013.01); *H04W 12/06* (2013.01)

(58) Field of Classification Search
CPC ... H04W 12/062; H04W 36/14; H04W 88/06; H04W 84/12; H04W 12/0431; H04W 36/18; H04W 12/06; H04W 12/069; H04W 4/025
See application file for complete search history.

(56) References Cited

U.S. PATENT DOCUMENTS

| | | | |
|---|---|---|---|
| 10,856,335 B2 * | 12/2020 | Uchiyama | H04W 92/18 |
| 2010/0091733 A1 * | 4/2010 | Hahn | H04W 12/062 |
| | | | 370/331 |
| 2012/0005731 A1 * | 1/2012 | Lei | H04W 12/062 |
| | | | 726/6 |
| 2012/0088517 A1 * | 4/2012 | On | H04W 16/10 |
| | | | 455/452.1 |
| 2016/0150467 A1 * | 5/2016 | Shaw | H04W 12/08 |
| | | | 370/329 |
| 2017/0105146 A1 * | 4/2017 | Zeng | H04W 64/00 |
| 2017/0215138 A1 * | 7/2017 | Shaw | H04W 12/062 |
| 2019/0158606 A1 * | 5/2019 | Guim Bernat | H04W 40/36 |

(Continued)

OTHER PUBLICATIONS

Casabianca et al., "Vehicle Destination Prediction Using Bidirectional LSTM with Attention Mechanism", Dec. 2021 (Year: 2021).*

(Continued)

*Primary Examiner* — Dung Hong
(74) *Attorney, Agent, or Firm* — Guntin & Gust, PLC; Dana B. LeMoine

(57) ABSTRACT

Offloading of data associated with vehicles can be managed. An offloader management component (OMC) associated with a backend server can predict a second location of a vehicle at a second time based on analyzing condition data indicative of a condition associated with the vehicle at a first time, prior to the second time, and location data indicative of a first location of the vehicle at the first time. Based on the predicting, and prior to the second time, OMC can instruct network equipment to authenticate a device associated with the vehicle and schedule a group of resources for use by the device at the second time. Based on the group of resources, the network equipment is able to provide a data communication service to the device at the second location to enable receipt of data by the backend server from the device via the network equipment.

20 Claims, 12 Drawing Sheets

---

800

802 — PREDICTING A SECOND LOCATION OF A VEHICLE AT A SECOND TIME BASED ON A RESULT OF ANALYZING CONDITION DATA INDICATIVE OF A CONDITION ASSOCIATED WITH THE VEHICLE AT A FIRST TIME PRIOR TO THE SECOND TIME AND LOCATION DATA INDICATIVE OF A FIRST LOCATION OF THE VEHICLE AT THE FIRST TIME

804 — BASED ON THE PREDICTING, AND PRIOR TO THE SECOND TIME, INSTRUCTING NETWORK EQUIPMENT TO SCHEDULE A GROUP OF RESOURCES FOR USE BY A FIRST COMMUNICATION DEVICE ASSOCIATED WITH THE VEHICLE AT THE SECOND TIME, WHEREIN, BASED ON THE GROUP OF RESOURCES, THE NETWORK EQUIPMENT CAN BE ABLE TO PROVIDE A DATA COMMUNICATION SERVICE TO THE FIRST COMMUNICATION DEVICE AT THE SECOND LOCATION TO ENABLE RECEIPT OF DATA BY A SECOND COMMUNICATION DEVICE FROM THE FIRST COMMUNICATION DEVICE VIA THE NETWORK EQUIPMENT

(56) References Cited

U.S. PATENT DOCUMENTS

| | | | |
|---|---|---|---|
| 2019/0380121 A1* | 12/2019 | Wu | H04W 4/40 |
| 2020/0120505 A1* | 4/2020 | Kim | H04W 12/062 |
| 2020/0314645 A1* | 10/2020 | Soryal | H04W 4/027 |
| 2023/0128597 A1* | 4/2023 | Liu | G06Q 50/14 |
| | | | 705/7.24 |

OTHER PUBLICATIONS

"5G; System Architecture for the 5G System (3GPP TS 23.501 version 15.2.0 Release 15)" ETSI, Jun. 2018, France, 219 pages.

\* cited by examiner

MANAGEMENT OF VEHICLE DATA TRAFFIC OFFLOADING

TECHNICAL FIELD

This disclosure relates generally to electronic communications, e.g., to management of vehicle data traffic offloading.

BACKGROUND

Communication devices can communicate data to other communication devices via a communication network. For example, a wireless device (e.g., mobile, cell, or smart phone; or electronic tablet or pad) can connect to and communicate with a wireless communication network (e.g., core network), via a base station associated with the wireless communication network, to communicate with another communication device connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

Communication devices also can be associated or integrated with vehicles, such as autonomous, semi-autonomous, or connected vehicles. Such communication devices can transmit and receive data to facilitate control and operation of those vehicles.

The above-described description is merely intended to provide a contextual overview regarding electronic communications, and is not intended to be exhaustive.

DETAILED DESCRIPTION

Figure 1:
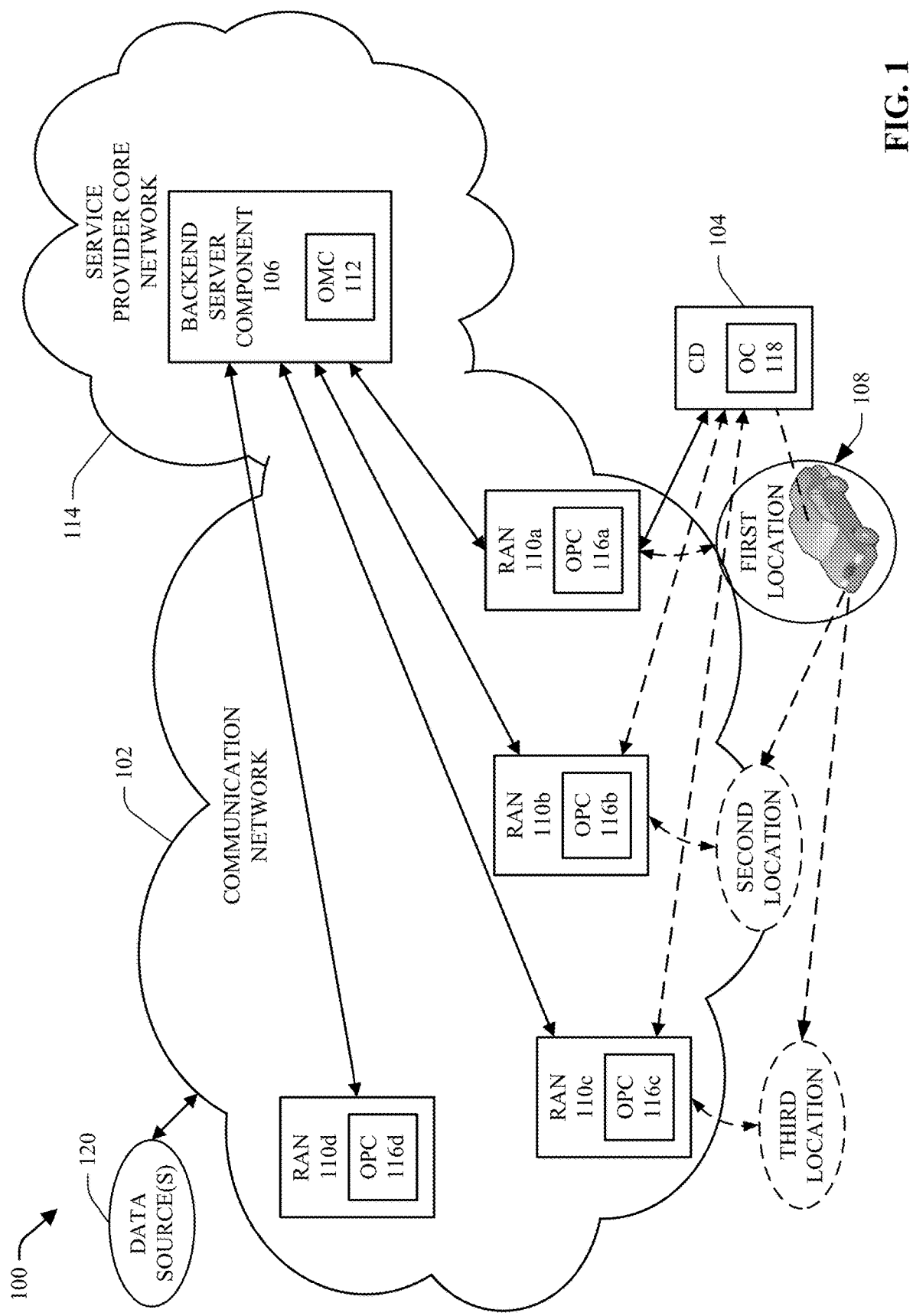
FIG. 1 illustrates a block diagram of an example system that can desirably manage offloading of data associated with vehicles, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to management of offloading of data associated with vehicles, such as autonomous, semi-autonomous, or connected vehicles. The techniques of the disclosed subject matter for the management of offloading of data associated with vehicles (e.g., via communication devices associated with or integrated with the vehicles) can provide for enhanced (e.g., improved, increased, more efficient, or optimal) offloading of data associated with control and operation of such vehicles, and enhanced user experience of users of such vehicles, among other benefits, as compared to existing techniques for offloading of data associated with vehicles, such as more fully described herein.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), wireless fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also can employ massive MIMO systems (e.g., hundreds of antennas at the transmitter side and receiver side). Typically, with a (Nt, Nr), where Nt denotes the number of transmit antennas and Nr denotes the number of receive antennas, the peak data rate can multiply with a factor of Nt over single antenna systems in a rich scattering environment.

Communication devices can communicate information (e.g., voice and/or data traffic) to other communication devices via a communication network, which can comprise a core network that can operate to enable wireless communication between communication devices. For example, a wireless communication device (e.g., mobile, cell, or smart phone; electronic tablet or pad; computer; Internet of Things (IoT) device; or other communication device) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network. Communication devices can operate and communicate via wireless or wireline communication connections (e.g., communication links or channels) in a communication network to perform desired transfers of data (e.g., voice and/or data communications), utilize services, engage in transactions or other interactions, and/or perform other operations.

Some vehicles, such as autonomous, semi-autonomous, or connected vehicles, can utilize communication devices to transmit or receive data relating to operation and control of such vehicles and/or for other desired purposes. There can be relatively large amounts of data (e.g., gigabytes or terabytes of data) communicated (e.g., offloaded) between the communication device associated with a vehicle and a server being employed to facilitate management of the operation of the vehicle.

While a vehicle is moving from location to location, the communication device of the vehicle may be connected to different base stations at various times. While the communication device is traveling by a base station, there may only be a relatively small window of time (e.g., seconds or minutes) for the communication device of the vehicle to offload data (e.g., relatively large amount of data) to the server. However, when a communication device of a vehicle first enters the coverage area of the base station and attaches to a base station, typically, when some existing techniques are employed, resources (e.g., communication network resources) and time are utilized to register and authenticate the communication device with the base station, and, after authenticating the communication device, and the base station can take some time to allocate resources to the communication device for the communication device to utilize to communicate data to the server via the base station. Further, when some existing techniques are employed, the amount of resources allocated by the base station to the communication device may be inadequate or insufficient to communicate the data to the server. The time utilized to authenticate the communication device and allocate resources to the communication device, while the vehicle is traveling through the coverage area of the base station, can undesirably (e.g., unwantedly) reduce the amount of time available to the communication device to offload the data to the server.

It can be desirable to overcome these and other deficiencies associated with existing techniques for managing communications of data associated with communication devices. The disclosed subject matter, by employed the enhanced techniques described herein, can overcome these and other deficiencies associated with existing techniques for managing communications of data associated with communication devices.

To that end, techniques for managing offloading of data associated with vehicles (e.g., autonomous or semi-autonomous vehicles) are presented. The disclosed subject matter can comprise an offloader management component (OMC) that can be associated with a backend server component. The OMC can predict or determine a second location of a vehicle for a second time period based at least in part on analyzing condition data indicative of a condition associated with the vehicle during a first time period (that is prior to the second time period) and location data indicative of a first location of the vehicle at the first time period. Based at least in part on the predicting or determining of the second location of the vehicle for the second time period, and prior to the second time period, the OMC can instruct network equipment (e.g., a RAN or base station) associated with the second location (e.g., network equipment providing wireless communication services to a coverage area that comprises the second location) to authenticate (e.g., pre-authenticate) a communication device associated with the vehicle and schedule a group of resources (e.g., all or a desired portion of the available resources of the network equipment) for use by the communication device during the second time period while the vehicle and associated communication device are located at the second location.

In some embodiments, the network equipment can comprise an offloader point component (OPC) (e.g., which can employ an offloading point RAN application (OPRA)) that can facilitate authenticating (e.g., pre-authenticating) the communication device and controlling the provision of resources to communication devices associated with vehicles to enable desirable offloading of data associated with vehicles to the backend server component. With regard to authentication of the communication device, in certain embodiments, prior to the second time period, the OPC can authenticate the communication device based at least in part on second authentication information received from other network equipment, such as other network equipment associated with the first location, with which the communication device was previously authenticated (e.g., based at least in part on first authentication information provided by the communication device to the other network equipment). The second authentication information can comprise, or can be generated based at least in part on, a portion of the first authentication information. Based at least in part on the group of resources provided (e.g., allocated) to the communication device prior to the second time period, during the second time period, the network equipment can be able to provide a data communication service to the communication device at the second location to enable receipt of data by the backend server component from the communication device via the network equipment. In certain embodiments, the communication device can comprise an offloader component that can facilitate desirable (e.g., enhanced, efficient, or optimal) offloading of data to the backend server component via network equipment, such as described herein. Since, during the second time period, the network equipment did not have to take the time to authenticate the communication device and did not have to take the time to allocate or schedule the group of resources to the communication, as such authentication and resource scheduling already had been performed prior to the second time period, the communication device can immediately or substantially immediately begin communicating (e.g., offloading) the data to the backend server component as soon as the communication device reaches the second location and connects to the network equipment.

These and other aspects and embodiments of the disclosed subject matter will now be described with respect to the drawings.

Referring now to the drawings, FIG. 1 illustrates a block diagram of an example system 100 that can desirably manage offloading of data associated with vehicles (e.g., autonomous, semi-autonomous, or connected vehicles), in accordance with various aspects and embodiments of the disclosed subject matter. The system 100 can comprise a communication network 102 that can comprise a mobility core network (e.g., a wireless communication network) and/or a packet data network (e.g., an Internet Protocol (IP)-based network, such as the Internet and/or intranet) that can be associated with the mobility core network.

The mobility core network (e.g., LTE, 5G, or other next generation (e.g., xG) core network) of the communication network 102 can operate to enable wireless communication between communication devices and/or between a communication device and the communication network 102. The communication network 102 can comprise various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, or other devices) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 102.

At given times, one or more communication devices, such as, for example, communication device (CD) 104, can attach or connect, or attempt to attach or connect, to the communication network 102 to communicate with other communication devices (e.g., backend server component 106 or other communication device) associated with (e.g., communicatively connected to) the communication network 102. In some embodiments, the CD 104 can be associated with (e.g., integrated with, utilized with, or otherwise associated with) a vehicle 108. In accordance with various embodiments, the vehicle 108 can be an autonomous, semi-autonomous, or connected vehicle that can operate in an autonomous or semi-autonomous manner based at least in part on instructions (e.g., commands) received from an on-board vehicle management system of the vehicle and/or the backend server component 106, which can be part of a remote vehicle management system. The remote vehicle management system and/or the on-board vehicle management system can be utilized to control operations and functions of the vehicle 108, including steering, turning, acceleration, speed, braking, parking, and/or other operations and functions of the vehicle 108 based at least in part on the instructions. In accordance with various embodiments, that the backend server component 106 can be located in a server provider core network that can be part of or associated with (e.g., communicatively connected to) the communication network 102. It is to be appreciated and understood that, while various embodiments disclosed herein are described with regard to a vehicle, in some embodiments, in place of an autonomous, semi-autonomous, or connected vehicle, a drone or other unmanned or manned aerial vehicle, or other movable device or equipment, can be associated with the CD 104 and can be operated in an autonomous, semi-autonomous, or connected manner.

A communication device (e.g., CD 104) also can be referred to as, for example, a device, a mobile device, or a mobile communication device. The term communication device can be interchangeable with (or include) a user equipment (UE) or other terminology. A communication device (or UE, device, or other similar term) can refer to any type of wireless device that can communicate with a radio network node in a cellular or mobile communication system. Examples of communication devices can include, but are not limited to, a device associated or integrated with a vehicle (e.g., automobile, airplane, bus, train, or ship, or other type of vehicle), a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, or other type of appliance having wireless communication functionality), a set-top box, an IP television (IPTV), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs). In some embodiments, a communication device (e.g., CD 104) can be connected to the communication network 102 via a wireless communication connection. In certain embodiments, a communication device (e.g., CD 104) can be connected to the communication network 102 (e.g., a wireline and/or IP-based network portion of the communication network 102) via a wireline communication connection.

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data traffic and voice traffic can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can comprise various network components or devices, which can include one or more RANs, such as RANs 110a, 110b, 110c, and/or 110d, wherein each RAN can comprise or be associated with a set of base stations (e.g., access points (APs)) that can serve communication devices located in respective coverage areas served by respective base stations in the mobility core network of the communication network 102. At various times, the communication network 102 can comprise or be associated with one or more base stations that can be macro cells associated with the service provider (e.g., carrier) with which the CD 104 has a subscription, one or more base stations that can be macro cells associated with one or more roaming service providers (e.g., roaming partners) that can provide roaming service to the CD 104, if and while the CD 104 is roaming in the communication network 102, and/or one or more smaller base stations that can be associated with private entities (and/or service providers) that can provide service to the CD 104, if the CD 104 is connected to such smaller base station. In some embodiments, the base stations can be communicatively connected to each other, and can exchange information, such as network-related information and UE-related information, with each other, such as described herein.

Each of the respective base stations, including the base stations of the RANs 110a, 110b, 110c, and/or 110d, can be associated with one or more sectors (not shown), wherein respective sectors can comprise respective cells. The cells can have respective coverage areas that can form the coverage area covered by the one or more sectors. Respective communication devices (e.g., CD 104) can be communicatively connected to the communication network 102 via respective wireless communication connections with one or more of the respective cells (or can be connected to the communication network 102 via a wireline connection).

The group of cells can comprise one or more macro cells and/or one or more smaller cells. For instance, the group of cells can comprise one or more macro cells associated with a service provider (e.g., carrier) that can provide communication services to one or more communication devices, such as a CD 104 associated with the vehicle 108 and/or a user, that can have a subscription with the service provider for the communication services. Additionally or alternatively, the group of cells can comprise one or more macro cells that can be associated with one or more roaming service providers (e.g., roaming partners) with respect to the CD 104 (e.g., while the CD 104 is roaming, the CD 104 can have the ability to connect to one or more cells of the one or more roaming service providers, which potentially may involve a cost for such use of a cell associated with a roaming service provider). Additionally or alternatively, the group of cells can comprise one or more smaller cells, such as femto cells, micro cells, pico cells, Wi-Fi cells, and/or CBRS cells, associated with one or more entities (e.g., private entities and/or service providers) that the CD 104 potentially can connect to for a communication session. As an example, an entity (e.g., an employer or a commercial business) can have a smaller cell to provide wireless communication service to communication devices located at or in proximity to the place of business of the entity, wherein the entity can have a subscription where the entity pays, to a service provider, a flat fee (e.g., flat fee for unlimited service or a certain amount or level of service) or a per usage fee for the communication services provided to communication devices via the smaller cell. A smaller cell, such as a CBRS cell, can communicate via the unlicensed spectrum (e.g., unlicensed CBRS spectrum), or a smaller cell can communicate via the licensed spectrum (e.g., carrier licensed spectrum).

In some embodiments, the one or more RANs (e.g., RANs 110a, 110b, 110c, and/or 110d) can be based on open-RAN (O-RAN) technology and standards. These standards can define the open interface that can support interoperability of network elements (e.g., radio unit (RU), central unit (CU), distributed unit (DU), real or near real time RAN intelligent controller (RIC), or other type of network element) from different entities (e.g., vendors). The network elements may be virtualized, e.g., software-based components that can run on a common virtualization/cloud platform. In certain embodiments, the O-RAN based RAN can utilize a common platform that can reduce reliance on proprietary platforms of service providers. The O-RAN based RAN also can employ standardized interfaces and application programming interfaces (APIs) to facilitate open source implementation of the O-RAN based RAN.

The CD 104 can be associated with (e.g., can comprise, provide, and/or utilize) one or more applications and associated services. At various times, and under various scenarios, a communication device, such as the CD 104, can desire to utilize one or more applications and associated services and/or can desire to communicate with another communication device (e.g., backend server component 106) associated with another user or entity (e.g., entity associated with a vehicle management system). The applications and services can relate to, for example, vehicle operation management, data (e.g., vehicle-related data) offloading, video streaming, video calls, video content, audio streaming, audio calls, audio content, electronic gaming, text messaging, multimedia messaging, emails, website content, medical information (e.g., medical information from wireless medical devices associated with users), utility information (e.g., utility information from smart meters), emergency-related information, military-related information, law enforcement-related information, fire response services-related information, disaster response services-related information, and/or other desired types of information, content, or activities.

In accordance with various embodiments, the communication network 102 can comprise or be associated with the backend server component 106, wherein the backend server component 106 can comprise or be associated with an offloader management component (OMC) 112 that can provide data offloading services to vehicles, such as vehicle 108, and can desirably (e.g., suitably, efficiently, enhancedly, or optimally) manage the offloading of data by communication devices (e.g., CD 104) associated with vehicles (e.g., vehicle 108), in accordance with defined data communication management criteria. The backend server component 106 can be located in the service provider core network 114, which can be part of or associated with the communication network 102.

In some embodiments, all or at least some of the RANs (e.g., RANs 110a, 110b, 110c, and/or 110d) can comprise respective offloading point components (OPCs), such as OPC 116a, OPC 116b, OPC 116c, and/or OPC 116d that can facilitate desirable offloading of data from communication devices (e.g., CD 104) associated with vehicles (e.g., vehicle 108) and the backend server component 106. In accordance with various embodiments, an OPC (e.g., OPC 116a, 116b, 116c, or 116d) can be located in the RAN (e.g., RANs 110a, 110b, 110c, or 110d), in or associated with an access and mobility management function (AMF) (not shown for reasons of brevity or clarity), in or associated with a session management function (SMF) (not shown for reasons of brevity or clarity), or in or associated with another component of the RAN. In certain embodiments, an OPC (e.g., OPC 116a, 116b, 116c, or 116d) can comprise or employ a distributed module (e.g., distributed software module), such as an offloading point RAN application (OPRA) that can facilitate the desirable offloading of data from communication devices (e.g., CD 104) associated with vehicles (e.g., vehicle 108) and the backend server component 106. It is to be appreciated and understood that the communication network 102 and RANs (e.g., RANs 110a, 110b, 110c, and/or 110d) also can comprise various other components, functions, nodes, routers, or devices that can facilitate communication of data between communication devices and through the communication network 102; however, for reasons of brevity or clarity, some of these components, functions, nodes, routers, or devices are not explicitly shown.

In certain embodiments, at least some communication devices, such as CD 104, associated with at least some vehicles, such as vehicle 108, can comprise an offloader component (OC) 118 that can be employed to desirably offload data from the communication device to the backend server component 106. The offloader component 118 can comprise or employ an offloader application, which can be subscriber provisioned and registered at or with the network carrier associated with the communication network 102 and/or service provider associated with the backend server component 106 and/or vehicle management system and service.

The system 100, employing an offloader management system that can comprise the backend server component 106, OMC 112, OPCs (e.g., OPC 116a, 116b, 116c, and/or 116d), offloader component 118, and associated components and devices can facilitate desirably instant or substantially instant transient ultra-fast data traffic offloading whenever vehicles (e.g., vehicle 108) and associated communication devices (e.g., CD 104) come to an offloading point (e.g., RAN 110a, 110b, 110c, or 110d that comprises an OPC).

Figure 2:
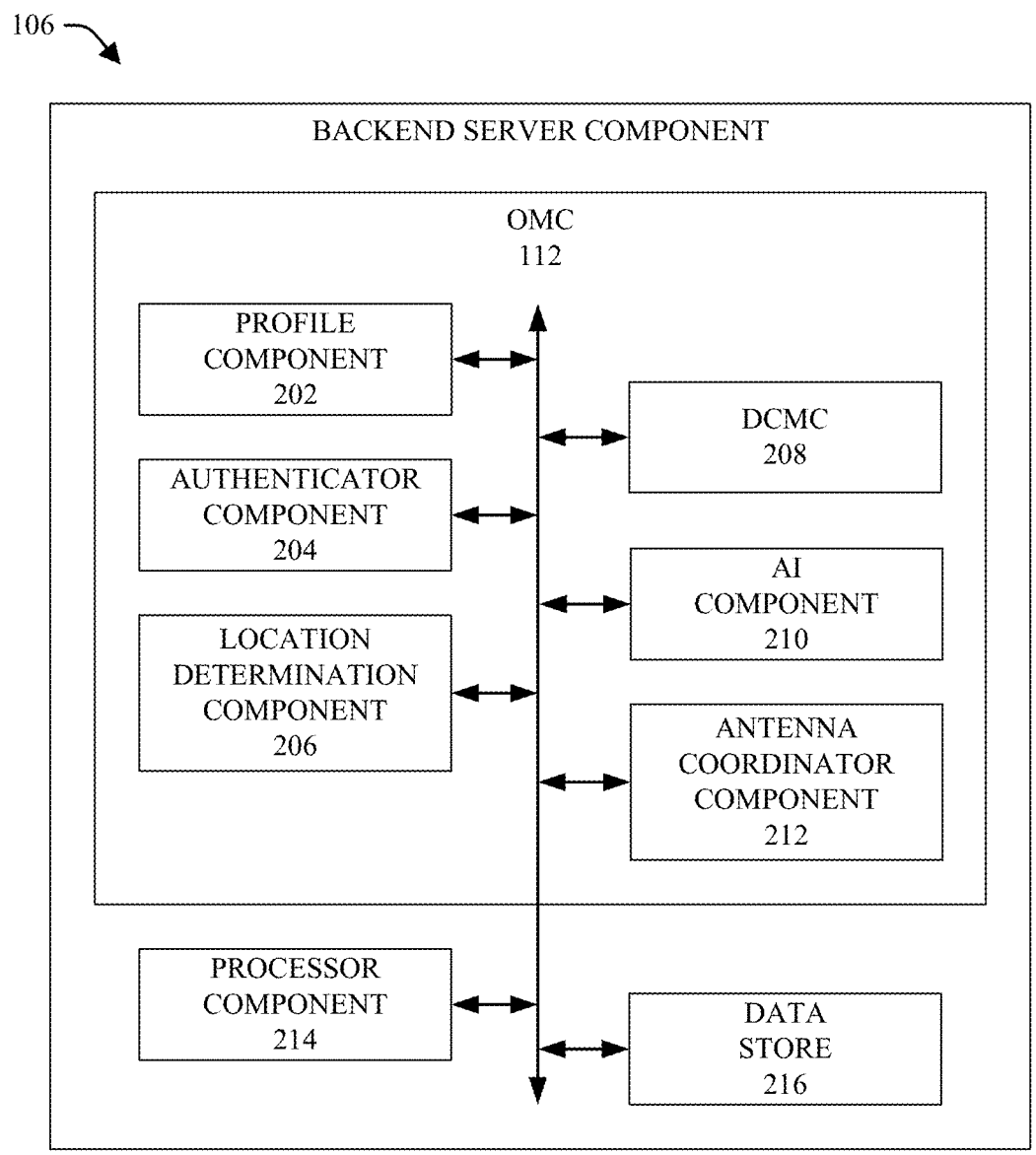
FIG. 2 depicts a block diagram of an example backend server component that can comprise an example offloader management component, in accordance with various aspects and embodiments of the disclosed subject matter.
Figure 3:
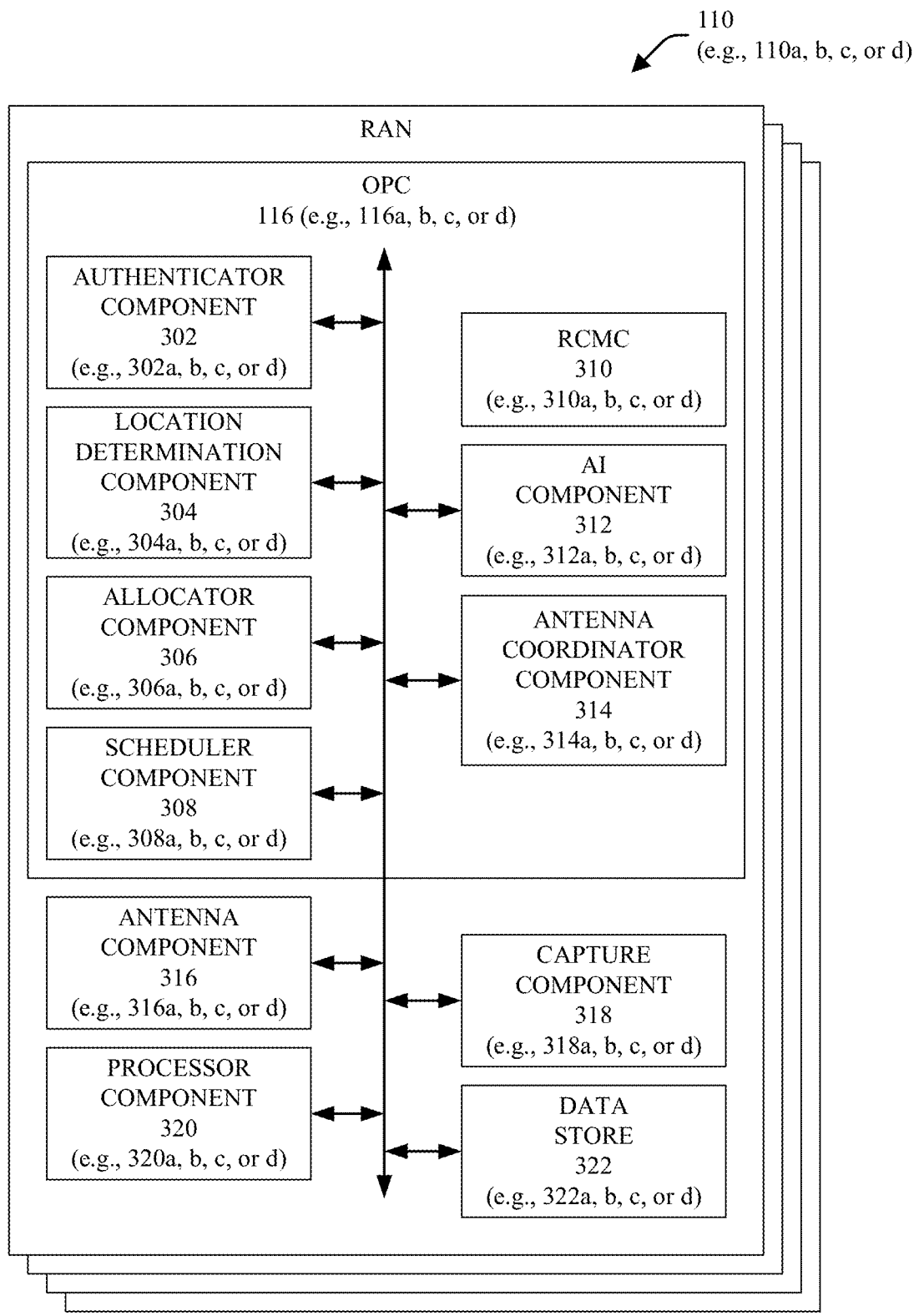
FIG. 3 depicts a block diagram of an example radio access network that can comprise an example offloader point component, in accordance with various aspects and embodiments of the disclosed subject matter.
Figure 4:
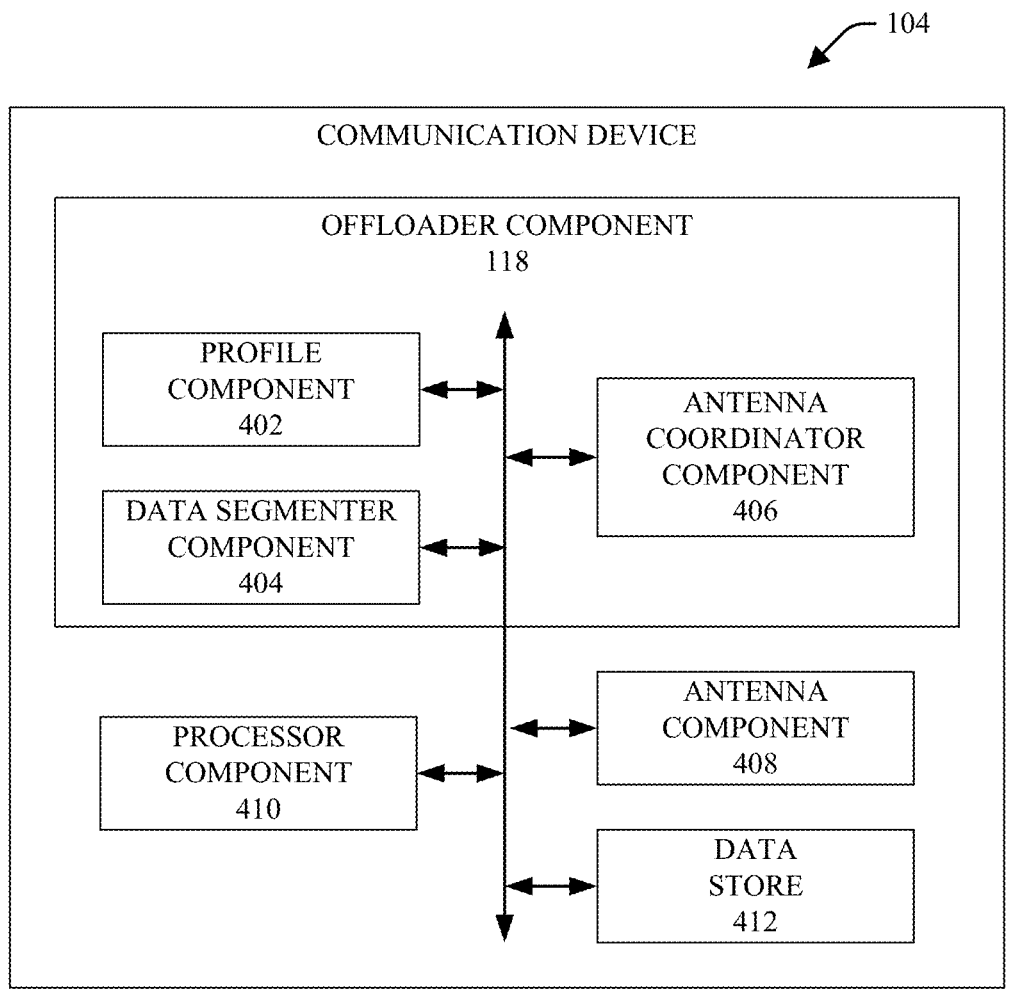
FIG. 4 depicts a block diagram of an example communication device that can comprise an example offloader component, in accordance with various aspects and embodiments of the disclosed subject matter.

Referring to FIGS. 2-4 (along with FIG. 1), FIG. 2 depicts a block diagram of an example backend server component 106 that can comprise an example OMC 112, FIG. 3 illustrates a block diagram of an example RAN 110 (e.g., RANs 110a, 110b, 110c, or 110d) that can comprise an example OPC 116 (e.g., OPC 116a, 116b, 116c, or 116d), and FIG. 4 depicts a block diagram of an example communication device 104 that can comprise an example offloader component 118, in accordance with various aspects and embodiments of the disclosed subject matter. The OMC 112 can comprise, for example, a profile component 202, an authenticator component 204, a location determination component 206, a data communication manager component (DCMC) 208, an artificial intelligence (AI) component 210, and/or an antenna coordinator component 212. The OPC 116 can comprise, for example, an authenticator component 302 (e.g., 302a, 302b, 302c, or 302d), location determination component 304 (e.g., 304a, 304b, 304c, or 304d), an allocator component 306 (e.g., 306a, 306b, 306c, or 306d), a scheduler component 308 (e.g., 308a, 308b, 308c, or 308d), a RAN communication manager component (RCMC) 310 (e.g., 310a, 310b, 310c, or 310d), AI component 312 (e.g., 312a, 312b, 312c, or 312d), and/or antenna coordinator component 314 (e.g., 314a, 314b, 314c, or 314d). The offloader component 118 can comprise, for example, a profile component 402, a data segmenter component 404, and/or an antenna coordinator component 406.

The profile component 202 of the OMC 112 can determine and generate respective profiles relating to respective vehicles (e.g., vehicle 108), associated users (e.g., user of the vehicle 108 and/or CD 104, and/or associated communication devices (e.g., CD 104). For instance, the profile component 202 can enable a user (e.g., user of the vehicle 108 and/or CD 104, and/or associated communication devices (e.g., CD 104) to register with the offloading service at the backend server component 106. The user can utilize the profile component 402 of the offloader component 118 of the CD 104 (or can utilize a web browser of a communication device) to interact or communicate with the profile component 202 of the OMC 112 to register the vehicle 108, associated user, and/or associated CD 104 with the offloading service. In response to registration of the vehicle 108, associated user, and/or associated CD 104 with the offloading service, the profile component 202 can create a policy profile for, and comprising information relating to, the vehicle 108, associated user, and/or associated CD 104. The policy component 402 of the offloader component 118 also can maintain a copy or a corresponding version of the policy profile for, and comprising information relating to, the vehicle 108, associated user, and/or associated CD 104. A policy profile can comprise identification information that can identify the vehicle 108, the user, and/or the CD 104, contact information (e.g., residential or work address(es), phone number(s), email address(es), or other contact information) associated with the user for contacting the user, subscription information relating to the subscription for the offloading service and/or communication services (e.g., mobile or wireless communication services provided by a service provider), and/or other desired information.

In some embodiments, the vehicle 108, user, and/or CD 104 can be provisioned as a special subscriber such that when the policy profile (e.g., special policy profile associated with the offloading service) is invoked by the OMC 112 and associated RAN 110, the appropriate RAN 110 can dedicate all or a desired (e.g., a wanted, a preferred, or an increased) portion of available resources of the RAN 110 to the vehicle 108 and associated CD 104 when the vehicle 108 and associated CD 104 are in wireless communication range of the RAN 110 (e.g., for a relatively short period of time, which typically can range on the order of seconds to minutes) as the vehicle travels through the coverage area of that RAN 110. The OPC 116 of the appropriate RAN(s) 110, which can be associated with a coverage area where the vehicle 108 is predicted or determined to travel to at a predicted or determined time, can make such resources available ahead of time before the vehicle 108 arrives to the RAN coverage area that can function as an offloading point for the offloading of data of the CD 104 associated with the vehicle 108, such as described herein. For example, in response to predicting or determining that, based at least in part on the current location, direction, speed, and/or other condition associated with the vehicle 108, during a future time period, the vehicle 108 is expected to travel to a first coverage area associated with RAN 110b or a second coverage area associated with RAN 110c, the OMC 112 can notify or instruct the OPC 116b of the RAN 110b and/or the OPC 116c of the RAN 110c that the vehicle 108 is expected to be in the first coverage area or second coverage area (e.g., for a certain amount of time) during the future time period, and the RAN 110b and/or RAN 110c is to prepare (e.g., allocate or schedule) a group of available resources for use by the CD 104 associated with the vehicle 108 during the future time period in anticipation of the arrival of the vehicle 108 in the first coverage area or second coverage area. Accordingly, prior to the future time when the vehicle 108 arrives to either the first coverage area associated with the RAN 110b or the second coverage area associated with the RAN 110c, the RAN 110b and/or RAN 110c already can have instructions on how to facilitate offloading the data from the CD 104 associated with the vehicle 108 to the backend server component 106, can have the CD 104 and/or associated vehicle 108 authenticated, and/or can have the group(s) of available resources scheduled for use by the CD 104.

In an example instance, during a first time period, the vehicle 108 can be located in a first location within a first coverage area associated with the RAN 110a. The CD 104 associated with the vehicle 108 can be registered with and connected to the RAN 110a (e.g., a first RAN or a first base station of the first RAN), and can be authenticated with the RAN 110a by the authenticator component 302a based at least in part on first authentication information (e.g., first encryption key and/or other authentication information) provided by the CD 104 to the authenticator component 302a and verified by the authenticator component 302a. The OMC 112, employing the location determination component 206, can receive location-related information associated with the vehicle 108 from the CD 104 (e.g., via the offloader component 118) associated with the vehicle 108 (e.g., location-related information relating to the location of the CD 104, and/or location-related information obtained from a vehicle navigation system associated with the vehicle 108), the RAN 110a, and/or another data source(s) 120 (e.g., a global positioning system (GPS) or other type of location tracking system that can be tracking the location of the vehicle 108; a map application or service (e.g., a map application or service being utilized by the CD 104 to provide directions to a desired destination of the vehicle 108); an application or service that can provide information relating to vehicle traffic or environmental conditions in a desired area; and/or another data source). The location determination component 206 and/or the AI component 210 can analyze (e.g., perform an AI-based analysis on) the location-related information. Based at least in part on the results of the analysis of the location-related information, the location determination component 206 can determine a first location (e.g., current location) of the vehicle 108 and/or a direction of travel of the vehicle 108 during the first time period (e.g., a current time period).

In some embodiments, based at least in part on such analysis results, the location determination component 206 and/or the AI component 210 can predict, estimate, or determine what the second location and/or third location of the vehicle 108 and associated CD 104 is potentially going to be during a second time period (e.g., a future time period). For instance, the location determination component 206 and/or the AI component 210 can predict, estimate, or determine that the vehicle is most likely to be (e.g., has the highest probability of being) at the second location during the second time period, and/or also may predict or determine that there is a substantial, but lower, likelihood (e.g., a substantial or significant, but lower, probability that satisfies a define minimum threshold probability or likelihood) that the vehicle 108 is going to be at the third location during the second time period.

As part of the analysis and prediction or determination of a potential future location(s) of the vehicle at a future time, the location determination component 206 and/or the AI component 210 can take into account (e.g., consider and incorporate into the analysis) various factors, characteristics, and/or conditions associated with the vehicle 108 in predicting or estimating the second location and/or third location of the vehicle 108 and associated CD 104 are potentially going to be located at during the second time period. The various factors, characteristics, and/or conditions can comprise respective vehicle traffic conditions (e.g., traffic congestion, vehicle accidents, road construction, road conditions, and/or other vehicle traffic conditions), and/or respective environmental conditions (e.g., rain, snow, and/or wind conditions; uphill or downhill slopes, or other landscape conditions; and/or other environmental conditions) associated with respective travel paths (e.g., highways, roads, streets, bridges, tunnels, waterways, or other travel paths) on which the vehicle potentially can travel, respective geometries, arrangements, or positioning of the respective travel paths, respective intersections and other travel paths associated with (e.g., connected to) the respective travel paths, and/or other desired factors, characteristics, and/or conditions.

In certain embodiments, the OMC 112 alternatively or additionally can have the RAN (e.g., RAN 110a, employing the location determination component 304a and/or AI component 312a) perform the analysis of the location-related information, and, based at least in part on the analysis results, determine the first location and/or a direction of travel of the vehicle 108 during the first time period, and/or predict, estimate, or determine what the second location and/or third location of the vehicle 108 and associated CD 104 is going to be during the second time period, in a manner same as or similar to that described herein with regard to the location determination component 206 and/or the AI component 210 of the OMC 112.

The DCMC 208 can determine or identify one or more RANs, such as RAN 110b and/or RAN 110c, that can provide communication services (e.g., wireless communication services) to one or more coverage areas that include the second location and/or third location, based at least in part on the results of analyzing RAN-related information obtained from the RANs (e.g., RANs 110a, 110b, 110c, or 110d) or other component of the communication network 102. For instance, the DCMC 208 can determine which RANs in the one or more coverage areas comprise the functionality (e.g., an OPC and/or OPRA) and/or have resources (e.g., network resources) that can be made available to the CD 104 and associated vehicle 108 during the second time period, based at least in part on the results of analyzing the RAN-related information.

The DCMC 208 also can determine an amount of data, or at least an approximate amount of data, that is to be communicated by the CD 104 to the backend server component 106 based at least in part on data offloading-related information received by the OMC 112 from the CD 104 (e.g., via the offloader component 118 of the CD 104) via the first network equipment (or other network equipment). For instance, the offloader component 118 can determine what data (e.g., data relating to control and operation of the vehicle 108 and/or other pertinent vehicle-related data) and/or the amount of such data is to be communicated (e.g., offloaded) to the backend server component 106, and can communicate, to the backend server component 106, the data offloading-related information, which can indicate what data and/or the amount of data that is to be communicated to the backend server component 106. The DCMC 208 can determine the amount of data to be offloaded by the offloader component 118 to the backend server component 106 based at least in part on the results of analyzing such data offloading-related information.

In some embodiments, the DCMC 208 and/or AI component 210 can predict or determine respective amounts of data (e.g., respective portions of the data) that can be communicated (e.g., concurrently or simultaneously communicated) by the CD 104 to the RAN 110b at the second location (or to the RAN 110c at the third location) during the second time period via respective communication paths or connections associated with respective communication technologies (and/or spectrums) based at least in part on the results of analyzing (e.g., performing an analysis or AI-based analysis on) information relating to conditions or characteristics associated with the second location (or third location), the RAN 110b (or to the RAN 110c), the vehicle 108, and/or the CD 104, historical conditions or characteristics associated therewith, the amount of resources that can be made available by the RAN 110b (or to the RAN 110c), and/or the amount of time (e.g., predicted, estimated, expected, or determined amount of time) that is going to be available to communicate data between the CD 104 and RAN 110b (or RAN 110c). The communication technologies (and/or spectrums) can comprise, for example, millimeter wave (mmWave), sub-6 gigahertz (GHz), citizens broadband radio service (CBRS), and/or other type of communication technology that can be available to the RAN 110 and CD 104 for communication of data. For instance, based at least in part on such analysis results, the DCMC 208 and/or AI component 210 can predict or determine that, during the second time period, a first portion (e.g., first amount) of data can be communicated between the CD 104 and RAN 110*b* (or RAN 110*c*) via a first communication connection using a first communication technology (e.g., mmWave), a second portion (e.g., second amount) of data can be communicated between the CD 104 and RAN 110*b* (or RAN 110*c*) via a second communication connection using a second communication technology (e.g., sub-6 GHz technology), and/or another portion(s) (e.g., another amount(s)) of data can be communicated between the CD 104 and RAN 110*b* (or RAN 110*c*) via another communication connection(s) using another communication technology(ies) (e.g., CBRS or another type of communication technology). In some embodiments, the respective portions of data can be communicated between the CD 104 and the RAN 110*b* (or RAN 110*c*) via the respective communication connections using the respective communication technologies concurrently, simultaneously, or in parallel.

In certain embodiments, if it is determined that there is only one type of communication technology available to offload data during the second time period, or it is otherwise determined that only one type of communication technology is to be utilized to offload data during the second time period (e.g., due to only a relatively small amount of data having to be offloaded), the DCMC 208 can determine that only the one type of communication technology is to be utilized to communicate the data from the CD 104 to the RAN 110*b* (or RAN 110*c*) during the second time period.

Prior to the second time period, the DCMC 208 can instruct the offloader component 118 of the CD 104 (e.g., can communicate instructions to the offloader component 118 to instruct the offloader component 118) to segment the data into respective segments of data of the respective portions (e.g., amounts) of data and associate respective unique identifiers with the respective segments of data, based at least in part on the determining or predicting of the respective amounts of data that can be communicated via the respective communication paths or connections associated with the respective communication technologies. In response to such instructions, the data segmenter component 404 can segment the data into the respective portions (e.g., first portion, second portion, and/or other portion(s)) of data and can associate the respective unique identifiers (e.g., first unique identifier, second unique identifier, and/or other unique identifier(s)) with the respective segments of data.

Also, prior to the second time period, the DCMC 208 can instruct the OPC 116*b* of the RAN 110*b* (or the OPC 116*c* of the RAN 110*c*) (e.g., can communicate instructions to the OPC 116*b* (or OPC 116*c*) to instruct the OPC 116*b* (or OPC 116*c*)) to authenticate the CD 104 associated with the vehicle 108 prior to the vehicle 108 arriving at the second location during the second time period. In response to such instructions, prior to second time period, the authenticator component 302*b* of the OPC 116*b* of the RAN 110*b* (or the authenticator component 302*c* of the OPC 116*c* of the RAN 110*c*) can authenticate the CD 104 based at least in part on authentication information relating to the CD 104 that can be received from the OPC 116*a* of the RAN 110*a* or the OMC 112 of the backend server component 106 prior to the second time period.

In some embodiments, prior to the second time period (e.g., during the first time period), the CD 104 already can be authenticated with the RAN 110*a* based at least in part on first authentication information associated with the CD 104. In accordance with various embodiments, prior to the second time period, the OPC 116*a* (e.g., authenticator component 302*a* of the OPC 116*a*) can communicate the first authentication information, second authentication information associated with the CD 104 obtained from (e.g., that was part of or provided to the OPC 116*a* by the CD 104 with) the first authentication information, or second authentication information associated with the CD 104 derived or determined based at least in part on the first authentication information to the OPC 116*b* of the RAN 110*b* (or the OPC 116*c* of the RAN 110*c*). For instance, the first authentication information can comprise a first encryption key and/or other first authentication information associated with the CD 104, and/or a second encryption key and/or other second authentication information associated with the CD 104, provided to the OPC 116*a* by the offloader component 118 of the CD 104; and/or the second authentication information, which can comprise a second encryption key and/or other second authentication information, can be derived or determined by the authenticator component 302*a* of the OPC 116*a* based at least in part on the first authentication information. In other embodiments, prior to the second time period, the authenticator component 204 of the OMC 112 can determine and generate the second authentication information associated with the CD 104, based at least in part on authentication information associated with the CD 104 that was provided to the OMC 112 by the CD 104, and can communicate the second authentication information associated with the CD 104 to the OPC 116*b* of the RAN 110*b* (or the OPC 116*c* of the RAN 110*c*).

In certain embodiments, prior to the second time period, the DCMC 208 also can instruct the OPC 116*b* of the RAN 110*b* (or the OPC 116*c* of the RAN 110*c*) (e.g., can communicate instructions to the OPC 116*b* (or OPC 116*c*) to instruct the OPC 116*b* (or OPC 116*c*)) to provide (e.g., reserve, allocate, schedule, or otherwise provide) a group of resources (e.g., all or a desired portion of available resources of the RAN 110*b* (or RAN 110*c*)) to the CD 104 associated with the vehicle 108 during the second time period to facilitate communication of the respective segments of data to the RAN 110*b* (or RAN 110*c*) via the respective communication paths or connections associated with the respective communication technologies, and forwarding of the respective segments of data to the backend server component 106. In some embodiments, the group of resources can comprise all resources of the RAN 110*b* (or RAN 110*c*) that are expected to be available during the second time period. In other embodiments, the group of resources can comprise an amount of resources of the RAN 110*b* (or RAN 110*c*) that is determined or predicted (e.g., by the DCMC 208) to be sufficient to facilitate (e.g., enable) the communication of the respective segments of data from the CD 104 to the RAN 110*b* (or RAN 110*c*). In certain embodiments, the group of resources allocated or provided for offloading of data by the CD 104 often can comprise a relatively larger amount of resources of the RAN 110*b* (or RAN 110*c*) than otherwise would typically be allocated or provided to the CD 104 with regard to other types of communications (e.g., phone call, email message, text message, audio streaming, and/or video streaming) by or associated with the CD 104, particularly when the amount of data to be offloaded by the CD 104 is a relatively large amount of data. In certain embodiments, the group of resources can comprise respective subgroups of resources that can be utilized to facilitate communication of the respective segments of data via the respective communication connections using the respective communication technologies.

In response to receiving such instructions, and prior to the second time period, the allocator component 306*b* of the OPC 116*b* of the RAN 110*b* (or the allocator component 306*c* of the OPC 116*c* of the RAN 110*c*) can determine the group of resources, which can include determining the amount or resources to be in the group of resources, to be allocated or reserved for use by the CD 104 to communicate the respective segments of data during the second time period, based at least in part on such instructions. Also, prior to the second time period, the scheduler component 308*b* of the OPC 116*b* of the RAN 110*b* (or the scheduler component 308*c* of the OPC 116*c* of the RAN 110*c*) can schedule the group of resources for use by the CD 104 to communicate the respective segments of data during the second time period.

During the second time period, when the vehicle 108 and associated CD 104 are at the second location (e.g., the vehicle is driving through the second coverage area associated with the RAN 110*b*) (or are at the third location (e.g., the vehicle is driving through the third coverage area associated with the RAN 110*c*)), the offloader component 118 of the CD 104 can utilize the group of resources to communicate the respective segments of data, and respectively associated metadata (e.g., respective unique identifiers), via the respective communication connections associated with the respective communication technologies (or the data via a communication connection associated with a communication technology, if the data is not segmented) to the RAN 110*b* (or the RAN 110*c*). On the RAN side, the RCMC 310*b* of the OPC 116*b* of the RAN 110*b* (or the RCMC 310*c* of the OPC 116*c* of the RAN 110*c*) can manage or facilitate the communication of the respective segments of data and respective metadata (or the data, if not segmented) between the CD 104 and the RAN 110*b* (or the RAN 110*c*).

In certain embodiments, the antenna coordinator component 212 of the OMC 112 can determine the coordinates of the antenna(s) of an antenna component 316*b* of the RAN 110*b* (or the antenna(s) of an antenna component 316*c* of the RAN 110*c*), based at least in part on antenna-related information obtained from the RAN, such as described herein. The antenna coordinator component 212 of the OMC 112 can provide antenna-related information, comprising antenna coordinates data, relating to the antenna(s) of the RAN 110*b* (or RAN 110*c*) to the antenna coordinator component 406 of the offloader component 118 to enable the antenna coordinator component 406 to adjust or set the coordinates or direction of the antenna(s) of the antenna component 408 of or associated with the CD 104 to correspond to the coordinates or direction of the antenna(s) of the antenna component 316*b* of the RAN 110*b* (or the antenna(s) of the antenna component 316*c* of the RAN 110*c*) to achieve a desirable communication connection with the RAN, such as described herein. In some embodiments, the antenna coordinator component 406 of the offloader component 118 and the antenna coordinator component 314*b* of the OPC 116*b* of the RAN 110*b* (or the antenna coordinator component 314*c* of the OPC 116*c* of the RAN 110*c*) can coordinate with each other while the vehicle 108 is traveling through the second location (or third location) to respectively adjust the respective directions of their respective antennas to achieve or maintain a desirable communication connection between the CD 104 and the RAN 110*b* (or RAN 110*c*), such as described herein.

During the second time period (or at a time thereafter), the RCMC 310*b* of the OPC 116*b* of the RAN 110*b* (or the RCMC 310*c* of the OPC 116*c* of the RAN 110*c*) can communicate the respective segments of data and respective metadata (or the data, if not segmented) to the backend server component 106. The backend server component 106 can receive the respective segments of data (or the data, if not segmented) and the respective metadata (e.g., the respective unique identifiers) from the RAN 110*b* (or RAN 110*c*).

The DCMC 208 of the OMC 112 can arrange or order the respective segments of data in a desired (e.g., specified or correct) order, based at least in part on the respective unique identifiers associated with the respective segments of data, such that the respective segments of data can be in an order that can correspond to the data (e.g., the original data being sent by the CD 104).

In some embodiments, the OMC 112 (e.g., employing the DCMC 208 and other components of the OMC 112) can determine a sequence of data offloads for the vehicle 108 at respective data offload points (e.g., respective RANs) associated with respective locations, in accordance with the defined data communication management criteria. For instance, the OMC 112 can determine or predict that the vehicle 108 and associated CD 104 is going to be at a first location in a first coverage area associated with a first RAN (e.g., RAN 110*b*) during a first time period, a second location in a second coverage area associated with a second RAN (e.g., RAN 110*c*) during a second time period, and/or another location(s) in another coverage area(s) associated with another RAN(s) (e.g., RAN 110*d* or other RAN) during another time period(s) (e.g., third time period, fourth time period, and/or other time period), based at least in part on the results of analyzing location-related information associated with the vehicle 108 and/or CD 104. Using the techniques described herein, the OMC 112 can determine and manage respective data offloads of respective groups of data (e.g., respective groups of respective segments of data) from the CD 104 to the respective RANs when the vehicle 108 and associated CD 104 are at the respective locations during the respective time periods. The OMC 112 can coordinate with the respective OPCs (e.g., OPC 116*b*, OPC 116*c*, OPC 116*d*, and/or other OPC) of the respective RANs (e.g., RAN 110*b*, RAN 110*c*, RAN 110*d*, and/or other RAN) to facilitate the respective authentication of the CD 104 by the respective RANs, and the allocation and scheduling of respective desired groups of resources by the respective RANs, prior to the respective time periods (e.g., prior to the vehicle 108 reaching the respective locations at the respective time periods), such as described herein.

The OMC 112 can continue to monitor and track the traveling and location of the vehicle 108 and the data offloading by the offloader component 118 of the CD 104. If, based at least in part on the results of analyzing information obtained by the monitoring and tracking, or as otherwise obtained, the OMC 112 determines that there has been a change to or deviation from an expected or predicted sequence of events (e.g., the vehicle 108 has changed its course of travel, a destination of the vehicle 108 for the trip has been changed, a stop that the vehicle 108 was predicted or determined to make did not occur, traffic conditions or environmental conditions associated with the vehicle 108 have changed, or other type of change of events), and such change or deviation can impact (e.g., negatively impact, or render undesirable, inefficient, or not feasible) the sequence of data offloads for the vehicle 108 at at least some of the respective data offload points (e.g., respective RANs) associated with the respective locations, the OMC 112 can determine a modification (e.g., adjustment or alteration) of the sequence of data offloads to generate a modified sequence of data offloads for the vehicle 108, and can implement or facilitate implementing the modified sequence of data offloads for the vehicle 108.

Figure 5:
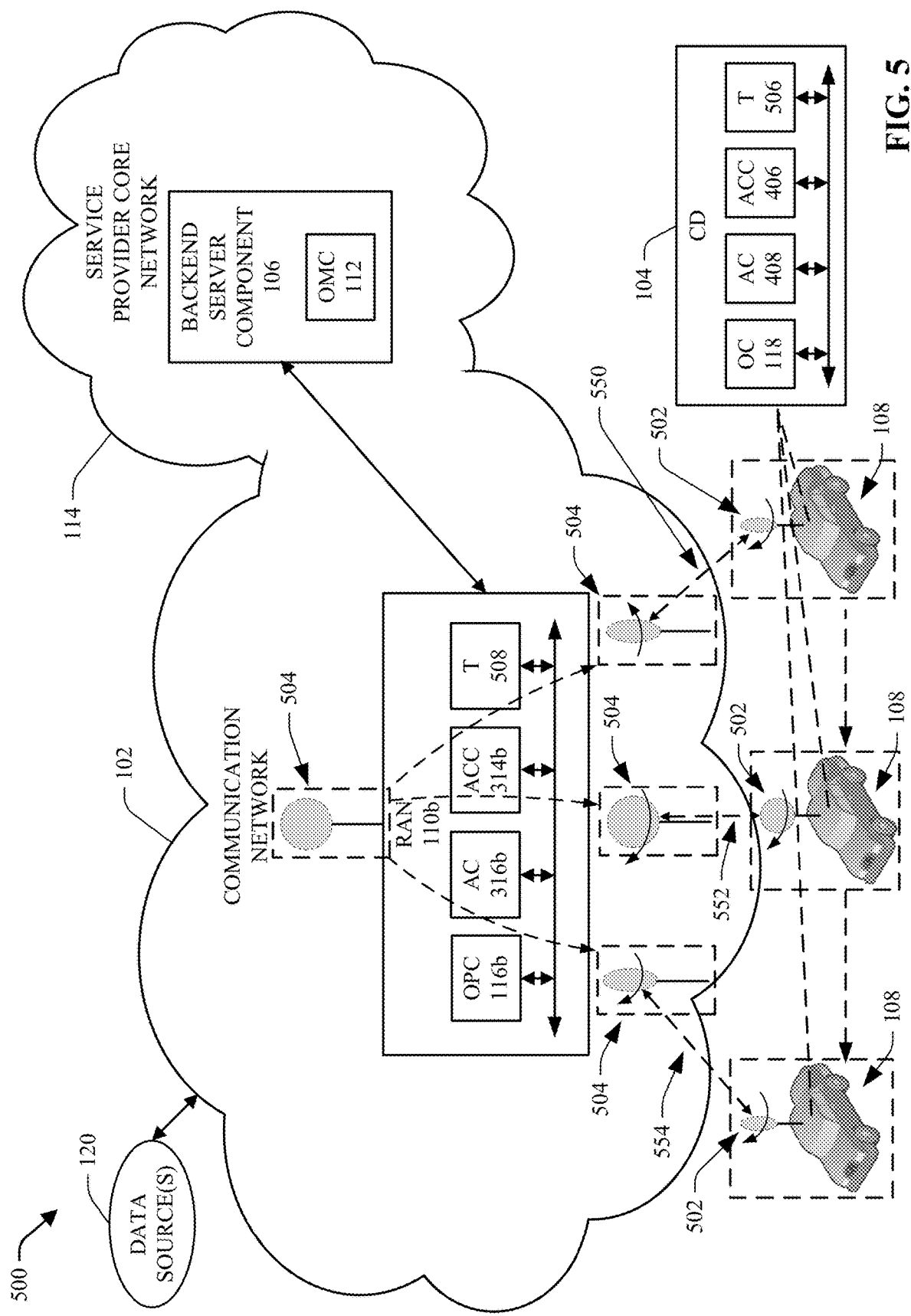
FIG. 5 illustrates a block diagram of an example system that can manage adjusting antennas associated with a RAN and antennas associated with a communication device associated with a vehicle to facilitate desirable communication (e.g., offloading) of data, in accordance with various aspects and embodiments of the disclosed subject matter.

Referring to FIG. 5 (along with FIGS. 1-4), FIG. 5 illustrates a block diagram of an example system 500 that can manage adjusting antennas associated with a RAN and antennas associated with a communication device associated with a vehicle to facilitate desirable communication (e.g., offloading) of data, in accordance with various aspects and embodiments of the disclosed subject matter. The system 500 can comprise the communication network 102, CD 104, the backend server component 106, the vehicle 108, one or more RANs 110 (e.g., RAN 110b), OMC 112, the service provider core network 114, one or more OPCs 116 (e.g., OPC 116b), the offloader component 118, and/or the data source(s) 120.

In some embodiments, one or more antennas, such as antenna 502, of the antenna component (AC) 408 of or associated with the CD 104 can be an adjustable or movable multi-mode directional antenna where the antenna coordinator component (ACC) 406 can adjust the direction or coordinates of the antenna 502 to correspond to the direction or coordinates of an antenna 504 (e.g., an adjustable or movable multi-mode directional antenna, as adjusted by antenna coordinator component (ACC) 314b), of one or more antennas, of the antenna component 316b of the RAN 110b to facilitate enhancing or maintaining a desirable communication connection (e.g., wireless communication connection) between the CD 104 and the RAN 110b. The antenna(s) 502 of the antenna component 408 and the antenna(s) 504 of the antenna component (AC) 316b can be associated with (e.g., connected to) transceivers (T) 506 and 508, and associated interfaces, of the CD 104 and RAN 110b, respectively, to transmit or receive wireless signals, comprising data (e.g., offloaded data or other data), via a wireless communication connection using a desired communication technology. In certain embodiments, the antenna(s) 502 and the antenna(s) 504 can be optical antennas that can be respectively associated with the transceivers 506 and 508 and associated interfaces, which can be optical transceivers and associated optical interfaces, of the CD 104 and RAN 110b, respectively, to transmit or receive optical wireless signals, comprising data, via an optical wireless communication connection using a desired optical communication technology. In some embodiments, the antenna components 408 and 316b can employ free space optical (FSO) technology to facilitate optical wireless transmission of signals between the CD 104 and RAN 110b. FSO wireless communication connections can enable very high speed, high throughput (e.g., up to 1 gigabits per second (Gbps), or even higher) wireless transmission of data between the CD 104 and RAN 110b. The respective bases of the respective antennas 502 and 504 can be movable (e.g., can enable antenna movement) to enable movement or adjustment of the respective directions of the respective antennas 502 and 504.

Prior to the time period where the vehicle 108 and associated CD 104 is going to be in the coverage area of the RAN 110b, the antenna coordinator component 212 of the OMC 112 can obtain (e.g., request and receive) antenna-related information relating to the antenna coordinates or direction of the antenna 504 of the RAN 110b from the antenna coordinator component 314b of the OPC 116b. The OMC 112 can communicate this antenna-related information, or other antenna-related information derived or determined from this antenna-related information, to the antenna coordinator component 406 of the offloader component 118. Based at least in part on such antenna-related information, the antenna coordinator component 406 can adjust the direction or coordinates of the antenna 502 to correspond to the direction or coordinates of the antenna 504. For instance, based at least in part on such antenna-related information, the antenna coordinator component 406 can adjust the direction or coordinates of the antenna 502 associated with the vehicle 108 such that the antenna 502 can have a line of sight (e.g., direct line of sight) to the antenna 504 of the RAN 110b as the traveling vehicle 108 enters the location (e.g., the coverage area or location within the coverage area) where the CD 104 and RAN 110b initiate a communication session to facilitate offloading data from the CD 104 to the backend server component 106.

In some embodiments, as the vehicle 108 and associated CD 104 are moving through the coverage area served by the RAN 110b, the antenna coordinator component 406 associated with the vehicle 108 and the antenna coordinator component 314b associated with the RAN 110b can coordinate with each other, and the antenna coordinator component 406 can adjust the direction or coordinates of the antenna 502 and/or the antenna coordinator component 314b can adjust the direction or coordinates of the antenna 504, to maintain a desirable line of sight between the antenna 502 and antenna 504, to facilitate maintaining desirable line-of-sight wireless communication connection and communication (e.g., optical or other type of wireless communication connection and communication) between the CD 104 and RAN 110b for as long as possible as the vehicle 108 approaches the location associated with the RAN 110b, travels through that location, and moves away from that location (e.g., as indicated at reference numerals 550, 552, and 554).

In certain embodiments, the RAN 110b can comprise a capture component 318 (e.g., camera or other type of sensor) that can monitor and/or capture images or other environmental information (e.g., photographs or video, or other type of sensor data) regarding the environment of the area (e.g., coverage area) in proximity to the RAN 110b. Based at least in part on the results of an analysis (e.g., data analysis or AI-based analysis) of the images or other environment information by the OPC 116b (e.g., the RCMC 310b, AI component 312b, or antenna coordinator component 314b), the OPC 116b can predict or determine conditions of the environment associated with the area, and can coordinate respective adjustments to the directions or coordinates of the antenna 504 of the RAN 110b and the antenna 502 associated with the vehicle 108 with the antenna coordinator component 406 (or other component of the CD 104) to account for environmental conditions associated with the area, and/or can coordinate other adjustments to other parameters associated with the CD 104 and/or RAN 110b, to facilitate achieving or maintaining a desirable communication connection between the CD 104 and RAN 110b. Such use of environmental information associated with the area can be particularly useful with regard to some types of communication connections using some types of communication technologies (e.g., mmWave, FSO, or other type of communication technology).

In some embodiments, the OMC 112, OPC 116b, and/or offloader component 118 can coordinate with each other to facilitate enhancing (e.g., increasing) the amount of time that the vehicle 108 is in a location associated with the RAN 110b to enhance (e.g., increase) the amount of time that the communication connection(s) between the CD 104 and RAN 110b can be maintained and the amount of data that can be communicated (e.g., offloaded or transferred) by the CD 104 to the backend server component 106. For instance, if the OMC 112 (or OPC 116b or offloader component 118) determines that the vehicle 108 can decrease its speed and/or adjust its travel route (e.g., towards the desired destination) while traveling through the location (e.g., the coverage area or location within the coverage area) associated with the RAN 110b where the offloading of data is to occur, to increase the amount of time the CD 104 can communicate the data to the RAN 110*b*, and thus, increase the amount of data offloaded to the backend server component 106, without undesirably (e.g., unduly, unwantedly, or inappropriately) impacting the trip of the vehicle 108 (and/or associated user (e.g., operator, driver, or passenger)) to the desired destination, the OMC 112 (or OPC 116*b*) can instruct or request that the offloader component 118 (or vehicle management system) decrease or facilitate decreasing the speed of the vehicle 108 and/or adjust (e.g., modify or alter) or facilitate adjusting the travel route of the vehicle 108 while traveling through the location to increase the amount of time the CD 104 can communicate the data to the RAN 110*b*.

With further regard to authentication by the RANs 110*a*, 110*b*, 110*c*, and/or 110*d*, communication devices (e.g., CD 104), and/or the backend server component 106, authentication information associated with vehicles (e.g., vehicle nodes, such as vehicle 108, and communication devices associated therewith) and/or authentication associated with vehicles can be relayed, forwarded, or propagated between nodes (e.g., fixed nodes that can be fixed in location or unfixed mobile nodes), such as RANs (e.g., using authenticator components 302*a*, 302*b*, 302*c*, and/or 302*d*) or other nodes (e.g., roadside equipment (RSE) nodes or mobile nodes, which can include vehicle nodes) associated with the communication network 102.

Thus, once a vehicle 108 and associated communication device (e.g., CD 104) has been authenticated by a node (e.g., RAN 110*a* using authenticator 302*a*), the vehicle 108 and associated communication device can be pre-authenticated by a next node (e.g., RAN 110*b* or RAN 110*c*) to save time by predicting the direction and estimated time of arrival of the vehicle node (e.g., vehicle 108 and associated CD 104) at a next location associated with a node and having the node (e.g., RAN 110*a*) provide authentication associated with the vehicle node to the next node (e.g., RAN 110*b* or RAN 110*c*) before the vehicle node reaches the next location to save time. Consequently, there can be no wasted time for authentication at every single node (e.g., upcoming RAN, RSE, another vehicle, or other type of node). The authentication solution can be built on the currently used transport layer security (TLS) certificates. Two potential scenarios are outlined below. In one scenario, a first node (e.g., node 1) and a second node (e.g., node 2) can authenticate each other and communicate (e.g., exchange safety messages, or other information). Node 2 can communicate with a third node (e.g., node 3), while, at the moment, node 1 cannot communicate with to node 3. However, if node 1 is moving towards node 2, the system can predict (based at least in part on direction, speed, history, traffic congestion, geometry or arrangement of travel paths, or other factors) that node 1 will encounter (be in the wireless range of) node 3 shortly. Node 2 can predict that multiple nodes will be in the range of node 1. Node 2 can authenticate (e.g., using an authenticator component) node 3 and vice versa, prior to node 1 being in the range of node 3. In some embodiments, node 2 also can create and provide a new encryption key to node 1 and node 3. The transmission of the encryption key can be encrypted to only node 1 and node 3, so that they each receive the encryption key and each transmission can be performed with a different key (e.g., [node 1<----->node 2] and [node 1<----->node 3]. When node 1 reaches node 3, node 1 and node 3 can communicate directly and/or immediately without having to authenticate (again) with respect to each other because the authentication operation was performed beforehand. In case the nodes use TLS certificates, then node 1 can provide node 2 with a public key for node 3, and can provide node 3 with a public key for node 2. Where there are multiple nodes, the original node can create a different key for each node.

In a TLS, a digital signature can be formed by encrypting a representation of a message. In some embodiments, a 2-way authentication (e.g., TLS) handshake and verification can take place between the nodes, each with its own digital certificate. The encryption can use a private key of a certificate authority, and can decrypt it using the certificate authority public key to verify the digital signature. To validate the signature, a hash of the same data (e.g., the public key) can be calculated. The system (e.g., employing an authenticator component associated with a node) can then decrypt the digital signature using the certificate authority's public key and compare two hash values of the system. Nodes can relay the authentication information of the communicating entities (e.g., vehicle nodes, RANs, or other communication entities) to the next node (e.g., mobile node or fixed node) so that once the vehicle is there, the vehicle has already been authenticated by predicting the direction and estimated time of arrival of the vehicle to save time. Thus, authentication time can be preserved at the nodes (e.g., upcoming RAN, RSE, or another vehicle).

Consequently, one node (e.g., fixed or mobile node) can communicate with many other nodes (e.g., fixed and/or mobile nodes) on the route of a moving vehicle (e.g., vehicle 108) to provide authentication procedures and authentication for remote nodes, to the moving vehicle, by disseminating encryption keys. For example, it can be the same encryption key for each communication leg (e.g., key 1 for the moving vehicle and remote node 1; key 2 for the moving vehicle and remote node 2; and so on). The encryption keys can be exchanged and encrypted.

In accordance with various embodiments, and with further regard to the AI components, AI component 210 of the OMC 112 and AI components 312 (e.g., 312*a*, *b*, *c*, or *d*) of the OPCs 116 (e.g., 116*a*, *b*, *c*, or *d*), an AI component (e.g., AI component 210, AI component 312) can perform an AI-based and/or machine learning (ML)-based analysis on data comprising or relating to data offloading associated with vehicles, communication devices (e.g., CD 104, or other communication devices), vehicles (e.g., vehicle 108), RANs (e.g., RANs 110*a*, *b*, *c*, or *d*), other nodes, users, user preferences associated with communication devices, vehicles, and users, communication device or vehicle location data, RAN or cell location data, antenna-related data associated with antennas associated with communication devices, vehicles, or RANs, communication technologies or spectrums (e.g., mmWave, sub-6 GHz, CBRS, optical data communication (e.g., FSO or other type of optical data communication), or other type of communication technology or spectrum) sensor data obtained from sensors, travel paths or routes associated with vehicles, geometry or arrangements of travel paths (e.g., freeways, highways, streets, roads, tunnels, bridges, or waterways), environmental condition-related information associated with environments associated with vehicles or RANs, metadata, applications, services, historical information relating thereto, or other types of information.

As disclosed, in accordance with various embodiments, in connection with or as part of such an AI-based or ML-based analysis, the AI component(s) (e.g., AI component 210, AI component 312) can employ, build (e.g., construct or create), and/or import, AI and/or ML techniques and algorithms, AI and/or ML models (e.g., trained AI and/or ML models), neural networks (e.g., trained neural networks), and/or graph mining to render and/or generate predictions, inferences, calculations, prognostications, estimates, derivations, forecasts, detections, and/or computations that can facilitate determining patterns in sets or items of information, determining a next (e.g., future or subsequent) location of a vehicle and associated communication device (e.g., vehicle 108 and associated CD 104), determining movement or potential movement of communication devices within and between RAN coverage areas associated with cells, determining an amount of time that a vehicle and associated communication device will be in the next location (e.g., next coverage area or location therein) associated with a RAN, determining available or anticipated available capacity and resources of cells of RANs (e.g., RANs 110a, b, c, or d), determining one or more types of communication technologies or spectrums that can be utilized by a RAN and communication device during a communication session (e.g., to offload data associated with a vehicle), determining available resources and/or type(s) of resources associated with a RAN, determining directions or coordinates of antennas associated with vehicles (and associated communication devices) and RANs, determining a type(s) of data being communicated or to be communicated during a communication session, determining anticipated data usage or consumption associated with a communication session, determining amount of data to be communicated during a data offload session, determining respective amounts of data to be communicated using respective communication technologies or spectrums, segmenting of data to be offloaded, determining a type of application or service being utilized for a communication session, determining respective communication conditions or anticipated communication conditions associated with respective cells with respect to a communication device associated with a vehicle for a communication session (e.g., data offloading session), determining respective loads or anticipated loads associated with respective cells of respective RANs, determining differences in coverage areas associated with cells due to environmental conditions, making other desired determinations, including the determinations described herein, and/or automating one or more functions or features of the disclosed subject matter (e.g., automating one or more functions or features of or associated with the backend server component 106, RANs (e.g., RANs 110a, b, c, or d), a communication device, or other device or component), as more fully described herein.

The AI component(s) (e.g., AI component 210, AI component 312) can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component(s) (e.g., AI component 210, AI component 312) can examine the entirety or a subset of the data (e.g., data associated with data offloading, vehicles, communication devices, RANs, or users; training data utilized to train the AI and/or ML models, neural networks, or AI and/or ML algorithms relating thereto; or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In accordance with various embodiments, the backend server component 106 can comprise or be associated with (e.g., communicatively connected to) processor component 214, a RAN(s) 110 (e.g., RANs 110a, b, c, or d) can comprise or be associated with processor component 320 (e.g., processor components 320a, b, c, or d), and/or the CD 104 can comprise or be associated with a processor 410 that respectively can work in conjunction with the other components of the backend server component 106, RAN(s) 110, and/or CD 104 to facilitate performing the various respective functions of the backend server component 106, RAN(s) 110, and/or CD 104. The processor component(s) (e.g., 214, 320a, b, c, or d, and/or 410) can employ one or more processors, microprocessors, or controllers that can process data, such as information relating to data offloading, vehicles, communication devices, users, user preferences, communication sessions, authentication, locations associated with vehicles and associated communication devices, locations of RANs and associated coverage areas, resources of RANs, communication technologies or spectrums associated with RANs or communication devices, antennas associated with RANs or communication devices, communication conditions associated with signals, cells, and/or communication devices, environmental conditions associated with coverage areas, applications, services, metadata, parameters, traffic flows, policies, defined data communication management criteria, algorithms (e.g., communication management algorithms, data offloading algorithms, AI or machine learning algorithms, or other algorithms, as disclosed, defined, recited, or indicated herein by the methods, systems, and techniques described herein), protocols, interfaces, tools, and/or other information, to facilitate operation of the backend server component 106, RANs 110 (e.g., RANs 110a, b, c, or d), and/or CD 104, as more fully disclosed herein, and control data flow between the backend server component 106, RANs 110 (e.g., RANs 110a, b, c, or d), and/or CD 104, and other components (e.g., a communication device, a base station or other network component or device of the communication network, data sources, applications, or other type of component or device) associated with the backend server component 106, RANs 110 (e.g., RANs 110a, b, c, or d), and/or CD 104.

In accordance with various embodiments, the backend server component 106 can comprise or be associated with (e.g., communicatively connected to) data store 216, the RAN(s) 110 (e.g., RANs 110a, b, c, or d) can comprise or be associated with data store 322 (e.g., data stores 322a, b, c, or d), and/or the CD 104 can comprise or be associated with data store 412, that can store data structures (e.g., user data, metadata), code structure(s) (e.g., modules, objects, hashes, classes, procedures) or instructions, information relating to data offloading, vehicles, communication devices, users, user preferences, communication sessions, authentication, locations associated with vehicles and associated communication devices, locations of RANs and associated coverage areas, resources of RANs, communication technologies or spectrums associated with RANs or communication devices, antennas associated with RANs or communication devices, communication conditions associated with signals, cells, and/or communication devices, environmental conditions associated with coverage areas, applications, services, metadata, parameters, traffic flows, policies, defined data communication management criteria, algorithms (e.g., communication management algorithms, data offloading algorithms, AI or machine learning algorithms, or other algorithms, as disclosed, defined, recited, or indicated herein by the methods, systems, and techniques described herein), protocols, interfaces, tools, and/or other information, to facilitate controlling operations associated with the backend server component 106, RANs 110 (e.g., RANs 110a, b, c, or d), and/or CD 104. In an aspect, the respective processor component(s) (e.g., 214, 320a, b, c, or d, and/or 410) can be functionally coupled (e.g., through a memory bus) to the respective data store(s) (e.g., data store 216, data stores 322a, b, c, or d, and/or data store 412) in order to store and retrieve information desired to operate and/or confer functionality, at least in part, to the respective components of the backend server component 106, RANs 110 (e.g., RANs 110a, b, c, or d), and/or CD 104, and/or substantially any other operational aspects of the backend server component 106, RANs 110 (e.g., RANs 110a, b, c, or d), and/or CD 104.

The disclosed techniques for the management of offloading of data associated with vehicles can desirably provide for enhanced (e.g., improved, more efficient, or optimal) offloading of data associated with vehicles (e.g., vehicle 108), utilization of resources associated with RANs (e.g., RANs 110a, b, c, or d) of the communication network 102, enhanced user experience of users of vehicles and associated communication devices (e.g., CD 104), and enhanced cost efficiency (e.g., reduction of costs) to users and service providers, among other benefits, as compared to existing techniques for offloading of data associated with vehicles.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

Described herein are systems, methods, articles of manufacture, and other embodiments or implementations that can facilitate offloading of data associated with vehicles and management of such data offloading, as more fully described herein. The offloading of data associated with vehicles and management of such data offloading, and/or other features of the disclosed subject matter, can be implemented in connection with any type of device with a connection to, or attempting to connect to, the communication network (e.g., a wireless or mobile device, a computer, a handheld device, or other device), any Internet of things (IoT) device (e.g., health monitoring device, toaster, coffee maker, blinds, music players, speakers, or other IoT device), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, or other type of device. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) or other type of radio network node.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF)

network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 6:
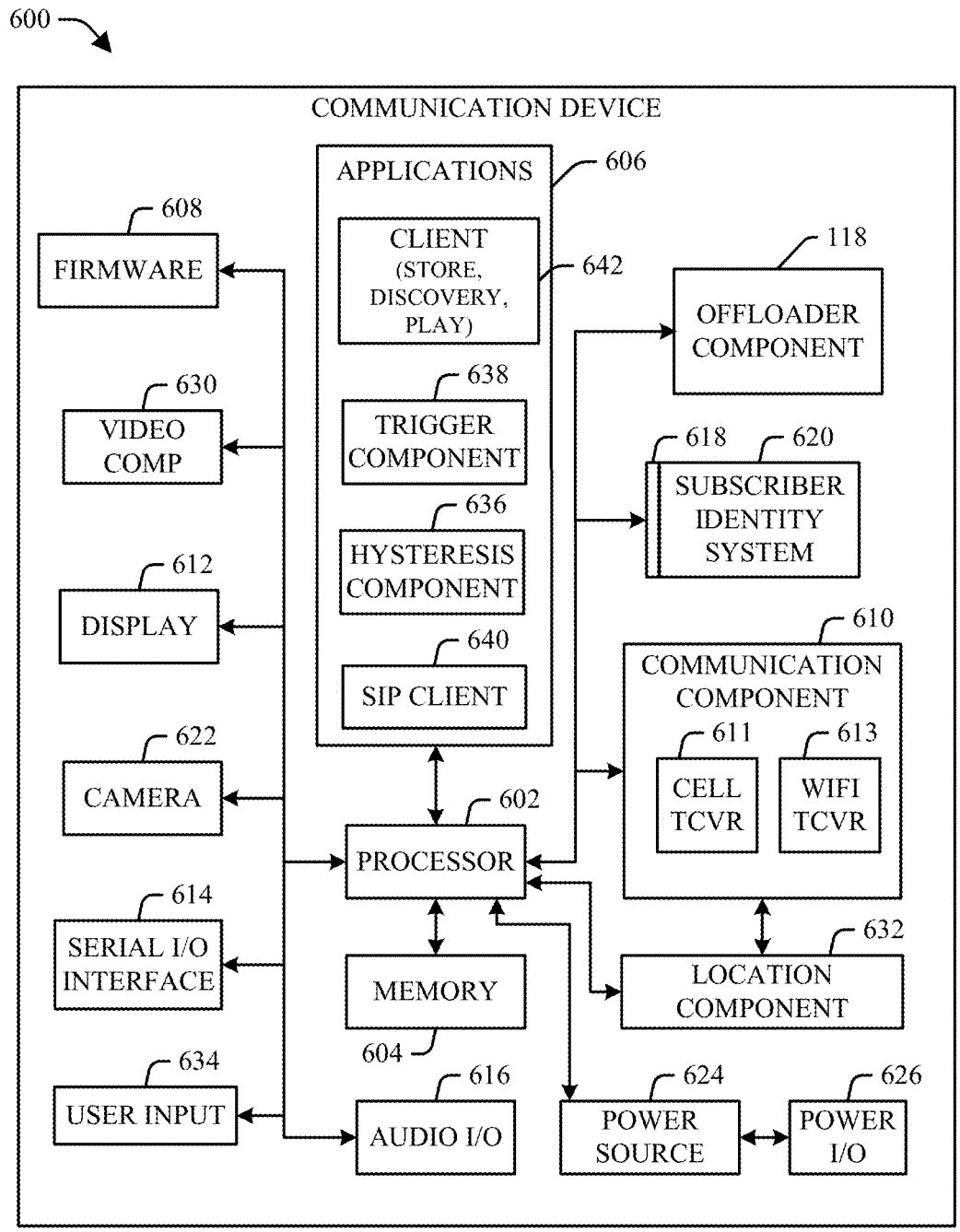
FIG. 6 depicts a block diagram of example communication device, in accordance with various aspects and embodiments of the disclosed subject matter.

Referring now to FIG. 6, depicted is an example block diagram of an example communication device 600 (e.g., communication device associated with a vehicle, UE, wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 600 can include a processor 602 for controlling and processing all onboard operations and functions. A memory 604 interfaces to the processor 602 for storage of data and one or more applications 606 (e.g., a video player software, user feedback component software, or other type of application). Other applications can include voice recognition of predetermined voice commands that facilitate initiation of the user feedback signals. The applications 606 can be stored in the memory 604 and/or in a firmware 608, and executed by the processor 602 from either or both the memory 604 or/and the firmware 608. The firmware 608 can also store startup code for execution in initializing the communication device 600. A communication component 610 interfaces to the processor 602 to facilitate wired/wireless communication with external systems, e.g., cellular networks, VoIP networks, and so on. Here, the communication component 610 can also include a suitable cellular transceiver 611 (e.g., a GSM transceiver) and/or an unlicensed transceiver 613 (e.g., Wi-Fi, WiMax) for corresponding signal communications. The communication device 600 can be a device such as a cellular telephone, a PDA with mobile communications capabilities, and messaging-centric devices. The communication component 610 also facilitates communications reception from terrestrial radio networks (e.g., broadcast), digital satellite radio networks, and Internet-based radio services networks.

The communication device 600 includes a display 612 for displaying text, images, video, telephony functions (e.g., a Caller ID function), setup functions, and for user input. For example, the display 612 can also be referred to as a "screen" that can accommodate the presentation of multimedia content (e.g., music metadata, messages, wallpaper, graphics, or other content). The display 612 can also display videos and can facilitate the generation, editing and sharing of video quotes. A serial I/O interface 614 is provided in communication with the processor 602 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 600, for example. Audio capabilities are provided with an audio I/O component 616, which can include a speaker for the output of audio signals related to, for example, indication that the user pressed the proper key or key combination to initiate the user feedback signal. The audio I/O component 616 also facilitates the input of audio signals through a microphone to record data and/or telephony voice data, and for inputting voice signals for telephone conversations.

The communication device 600 can include a slot interface 618 for accommodating a SIC (Subscriber Identity Component) in the form factor of a card Subscriber Identity Module (SIM) or universal SIM 620, and interfacing the SIM card 620 with the processor 602. However, it is to be appreciated that the SIM card 620 can be manufactured into the communication device 600, and updated by downloading data and software.

The communication device 600 can process IP data traffic through the communication component 610 to accommodate IP traffic from an IP network such as, for example, the Internet, a corporate intranet, a home network, a person area network, or other network, through an ISP or broadband cable provider. Thus, VoIP traffic can be utilized by the communication device 600 and IP-based multimedia content can be received in either an encoded or a decoded format.

A video processing component 622 (e.g., a camera) can be provided for decoding encoded multimedia content. The video processing component 622 can aid in facilitating the generation, editing, and sharing of video quotes. The communication device 600 also includes a power source 624 in the form of batteries and/or an AC power subsystem, which power source 624 can interface to an external power system or charging equipment (not shown) by a power I/O component 626.

The communication device 600 can also include a video component 630 for processing video content received and, for recording and transmitting video content. For example, the video component 630 can facilitate the generation, editing and sharing of video quotes. A location tracking component 632 facilitates geographically locating the communication device 600. As described hereinabove, this can occur when the user initiates the feedback signal automatically or manually. A user input component 634 facilitates the user initiating the quality feedback signal. The user input component 634 can also facilitate the generation, editing and sharing of video quotes. The user input component 634 can include such conventional input device technologies such as a keypad, keyboard, mouse, stylus pen, and/or touch screen, for example.

Referring again to the applications 606, a hysteresis component 636 facilitates the analysis and processing of hysteresis data, which is utilized to determine when to associate with the access point. A software trigger component 638 can be provided that facilitates triggering of the hysteresis component 636 when the Wi-Fi transceiver 613 detects the beacon of the access point. A SIP client 640 enables the communication device 600 to support SIP protocols and register the subscriber with the SIP registrar server. The applications 606 can also include a client 642 that provides at least the capability of discovery, play and store of multimedia content, for example, music.

The communication device 600, as indicated above related to the communication component 610, can include an indoor network radio transceiver 613 (e.g., Wi-Fi transceiver). This function supports the indoor radio link, such as IEEE 802.11, for the dual-mode GSM device (e.g., communication device 600). The communication device 600 can accommodate at least satellite radio services through a device (e.g., handset device) that can combine wireless voice and digital radio chipsets into a single device (e.g., single handheld device).

In some embodiments, the communication device 600 can comprise the offloader component 118 that can offload data or manage (e.g., control) or facilitate managing such offloading of data associated with a vehicle (e.g., vehicle 108), in accordance with a profile and/or the defined data communication management criteria, such as more fully described herein.

Figure 7:
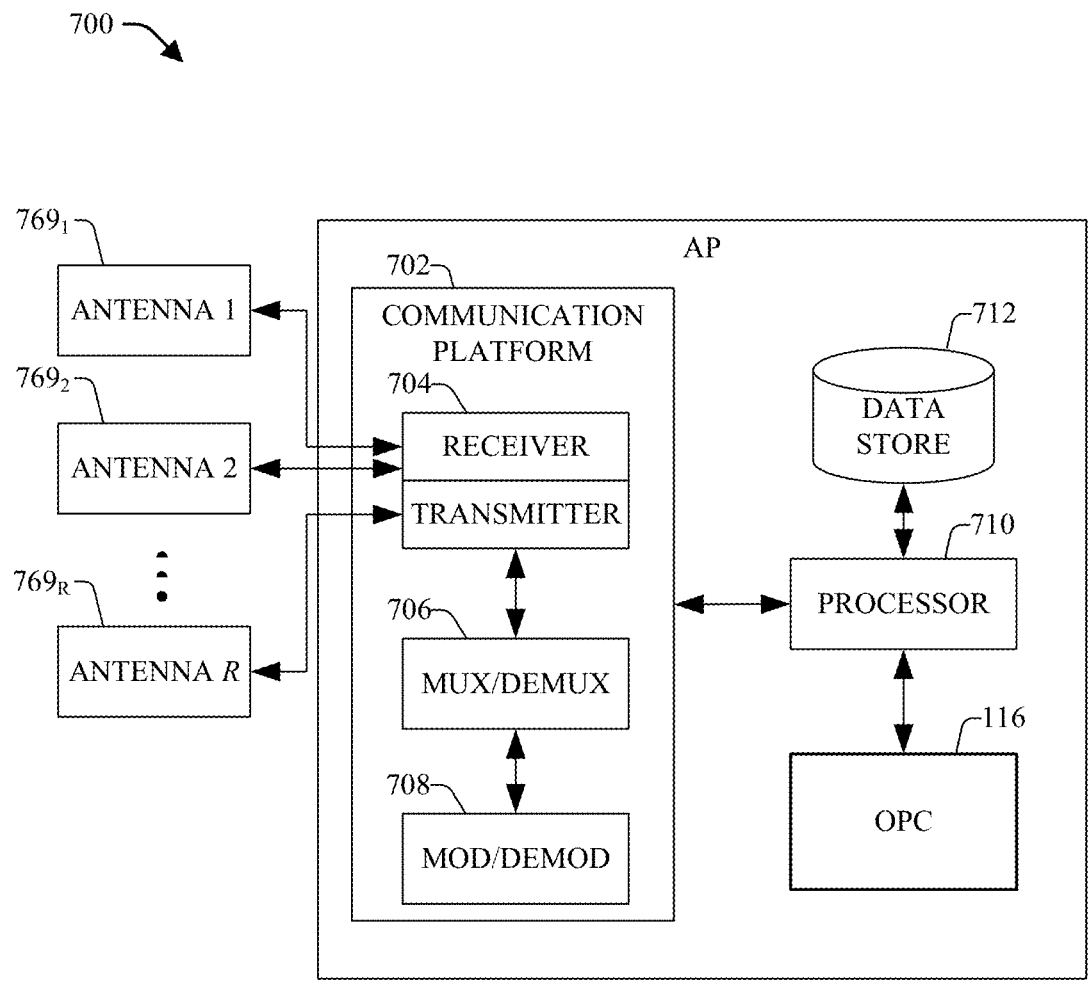
FIG. 7 illustrates a block diagram of an example access point, in accordance with various aspects and embodiments of the disclosed subject matter.

FIG. 7 illustrates a block diagram of an example access point (AP) 700 (e.g., macro base station, femto AP, pico AP, CBRS AP, Wi-Fi AP, Wi-Fi-direct AP, or other type of AP), in accordance with various aspects and embodiments of the disclosed subject matter. The AP 700 can receive and transmit signal(s) from and to wireless devices like access points (e.g., base stations, femtocells, picocells, or other type of AP), access terminals (e.g., UEs), wireless ports and routers, and the like, through a set of antennas 7691-769R. In an aspect, the antennas 7691-769R are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), or another desired multiplexing scheme. In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of the communication platform 702, and can modulate information according to multiple modulation techniques, such as frequency modulation, amplitude modulation (e.g., M-ary quadrature amplitude modulation (QAM), with M a positive integer), phase-shift keying (PSK), and the like.

The AP 700 also can comprise a processor(s) 710 that can be configured to confer and/or facilitate providing functionality, at least partially, to substantially any electronic component in or associated with the AP 700. For instance, the processor(s) 710 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 700 can include a data store 712 that can store data structures; code instructions; rate coding information; information relating to measurement of radio link quality or reception of information related thereto; information relating to communication conditions (e.g., signal-to-interference-plus-noise ratio (SINR), reference signal received power (RSRP), reference signal received quality (RSRQ), channel quality indicator (CQI), and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined threshold quality of service (QoS) values, or other type of threshold value), metadata, parameters, traffic flows, policies, rules, signaling, defined data communication management criteria, defined network security criteria, network security algorithms, protocols, interfaces, tools, and/or other information; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 710 can be coupled to the data store 712 in order to store and retrieve information (e.g., information, such as algorithms, relating to multiplexing/demultiplexing or modulation/demodulation; information relating to radio link levels; information relating to communication conditions (e.g., SINR, RSRP, RSRQ, CQI, and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined QoS values, or other type of threshold value), metadata, parameters, traffic flows, policies, rules, signaling, defined data communication management criteria, defined network security criteria, network security algorithms, protocols, interfaces, tools, and/or other information that can be desired to operate and/or confer functionality to the communication platform 702 and/or other operational components of AP 700.

In some embodiments, the AP 700 can comprise an OPC 116 that can facilitate offloading of data associated with vehicles and associated communication devices, in accordance with the defined data communication management criteria, such as more fully described herein. The OPC 116 can be the same as or similar to, and/or can comprise the same or similar functionality as, the OPCs, such as more fully described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 8-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 8:
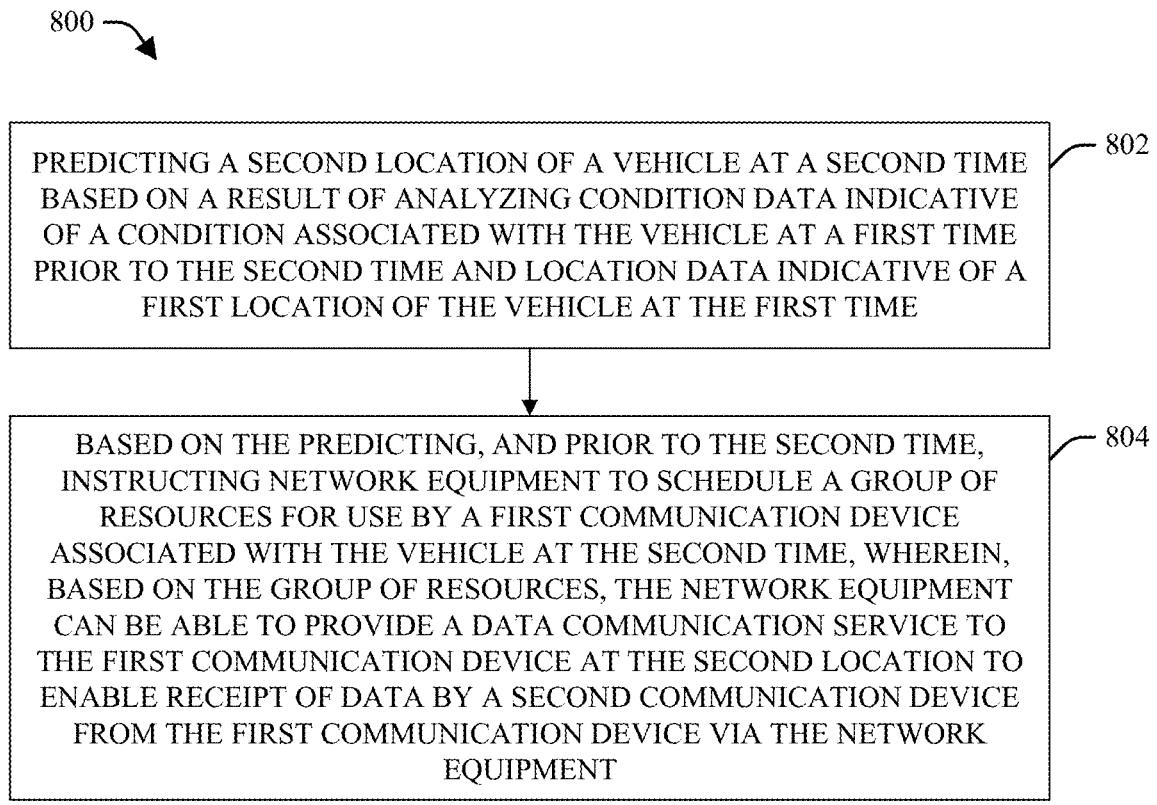
FIG. 8 illustrates a flow chart of an example method that can manage offloading of data associated with a vehicle and associated communication device associated with a communication network, in accordance with various aspects and embodiments of the disclosed subject matter.

FIG. 8 illustrates a flow chart of an example method 800 that can manage offloading of data associated with a vehicle and associated communication device associated with a communication network, in accordance with various aspects and embodiments of the disclosed subject matter. The method 800 can be employed by, for example, a system comprising the backend server component comprising the OMC, RANs comprising OPCs, communication device comprising an offloader component and associated with a vehicle, a processor component(s) (e.g., of or associated with the OMC, OPCs, and/or offloader component), and/or a data store (e.g., of or associated with the OMC, OPCs, and/or offloader component).

At 802, a second location of a vehicle at a second time can be predicted based at least in part on a result of analyzing condition data indicative of a condition associated with the vehicle at a first time that is prior to the second time and location data indicative of a first location of the vehicle at the first time. The OMC (e.g., which can employ the AI component, AI-based model, and/or AI-based technology) of a backend server component can predict or determine the second location of the vehicle at the second time based at least in part on the result of analyzing the condition data, which can be indicative of the condition associated with the vehicle (e.g., traffic, street, vehicle operation, or other condition associated with the vehicle) at the first time that is prior to the second time and location data, which can be indicative of the first location of the vehicle at the first time, such as described herein.

At 804, based at least in part on the predicting, and prior to the second time, network equipment can be instructed to schedule a group of resources for use by a first communication device associated with the vehicle at the second time, wherein, based at least in part on the group of resources, the network equipment can be able to provide a data communication service to the first communication device at the second location to enable receipt of data by a second communication device from the first communication device via the network equipment. Prior to the second time, the OMC can instruct the network equipment (e.g., RAN or base station of the RAN) to schedule the group of resources for use by the first communication device associated with the vehicle at the second time. Based at least in part on the group of resources, the network equipment can be able to provide the data communication service (e.g., data offloader service) to the first communication device at the second location to enable receipt of the data by the second communication device (e.g., backend server component) from the first communication device via the network equipment, such as described herein.

Figure 9:
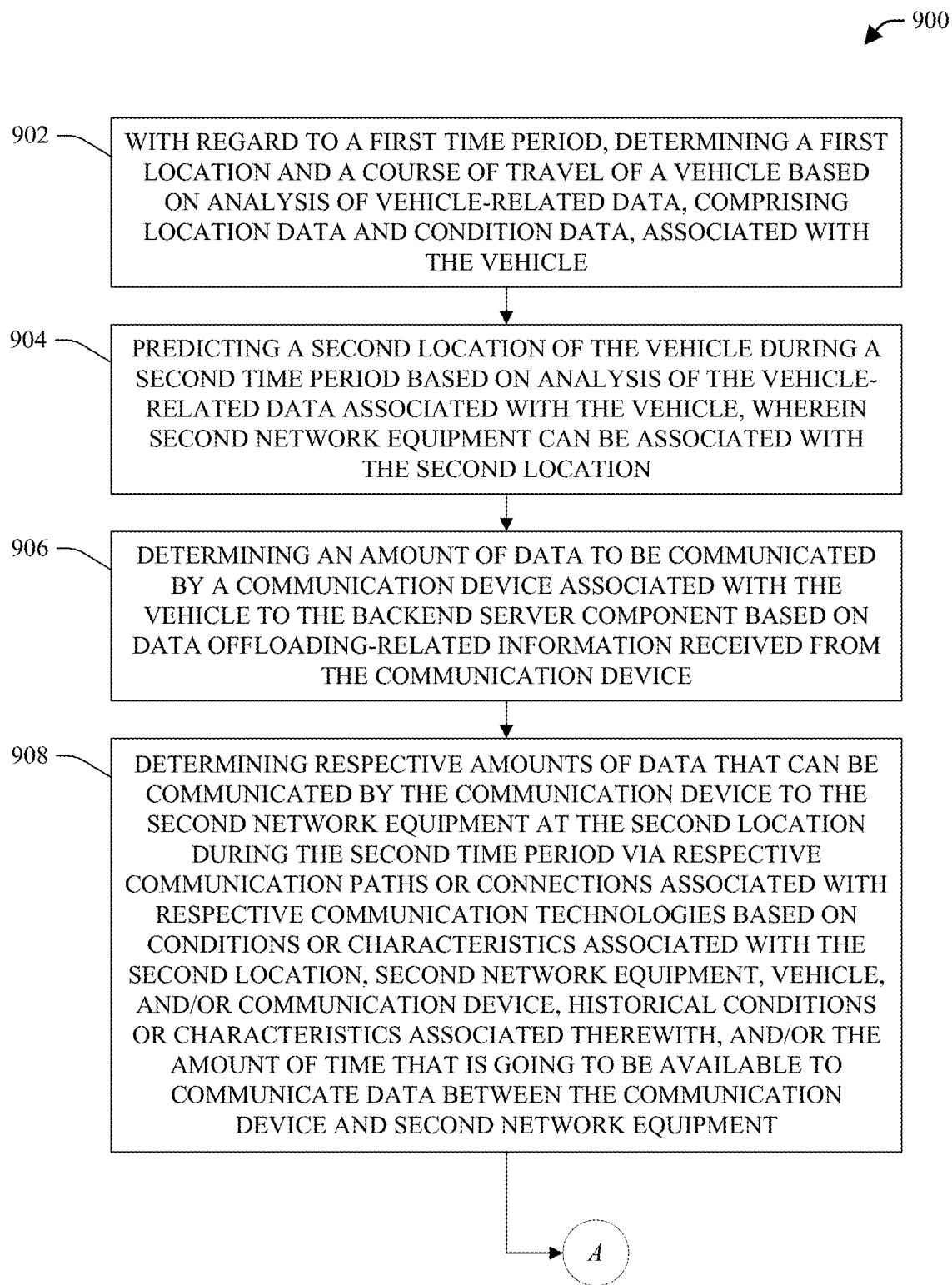
FIGS. 9 and 10 depict a flow chart of another example method that can manage offloading of data associated with a vehicle and associated communication device associated with a communication network, in accordance with various aspects and embodiments of the disclosed subject matter.
Figure 10:
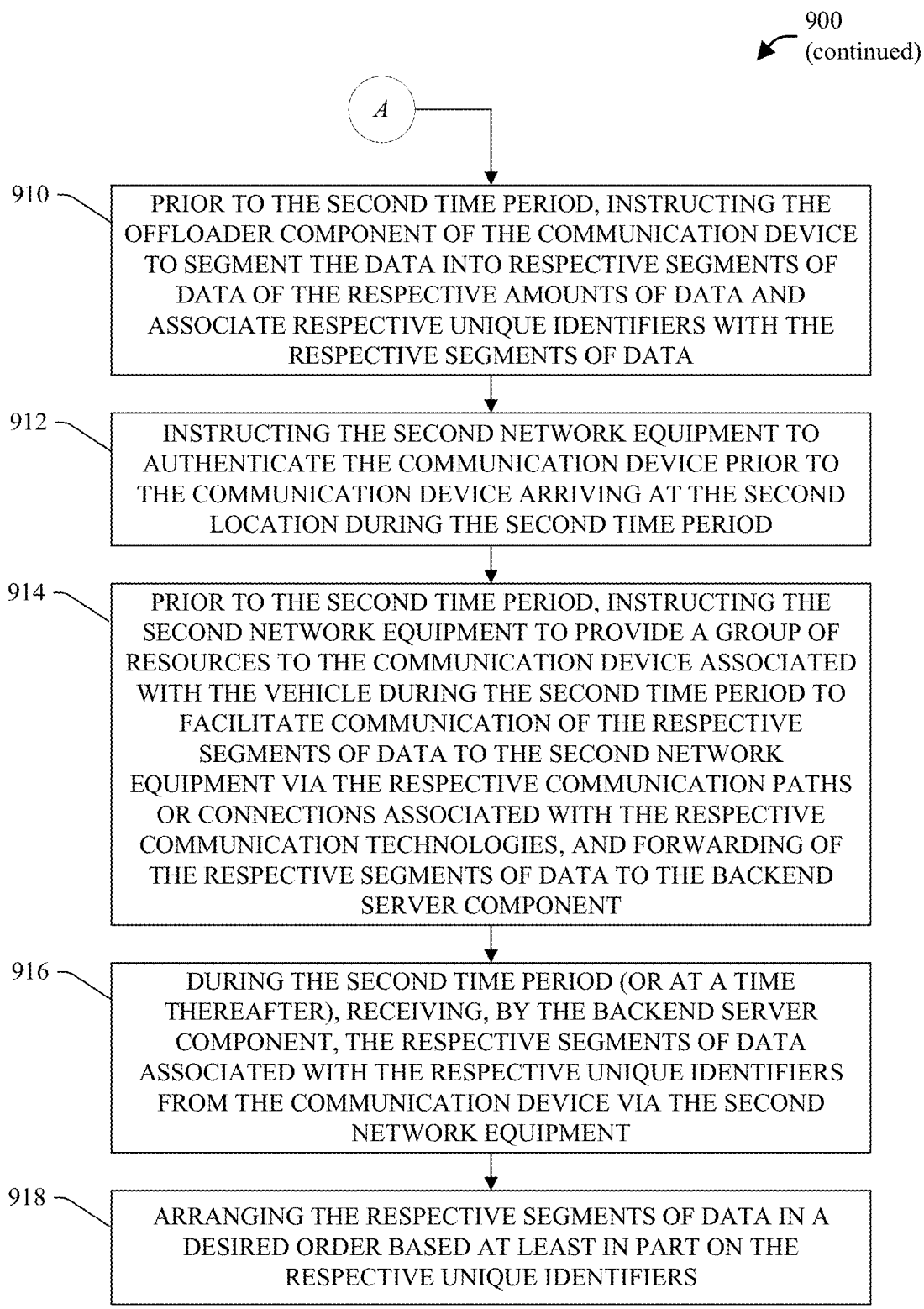

FIGS. 9 and 10 depict a flow chart of another example method 900 that can manage offloading of data associated with a vehicle and associated communication device associated with a communication network, in accordance with various aspects and embodiments of the disclosed subject matter. The method 900 can be employed by, for example, a system comprising the backend server component comprising the OMC, RANs comprising OPCs, communication device comprising an offloader component and associated with a vehicle, a processor component(s) (e.g., of or associated with the OMC, OPCs, and/or offloader component), and/or a data store (e.g., of or associated with the OMC, OPCs, and/or offloader component).

At 902, with regard to a first time period, a first location and a course of travel of a vehicle can be determined based at least in part on analysis of vehicle-related data, comprising location data and condition data, associated with the vehicle. With regard to the first time period, the OMC can determine the first location and the course (e.g., direction, path, or other travel-related characteristic) of travel of the vehicle can be determined based at least in part on the results of the analysis of the vehicle-related data, comprising the location data relating to the first location and the condition data relating to a condition(s), associated with the vehicle. At the first location, a communication device associated with the vehicle can be associated with (e.g., authenticated with and communicatively connected to) first network equipment (e.g., a first RAN or a first base station of the first RAN) associated with the first location (e.g., first network equipment that has a first coverage area that includes the first location).

At 904, a second location of the vehicle during a second time period can be predicted based at least in part on analysis of the vehicle-related data associated with the vehicle, wherein second network equipment can be associated with the second location. The OMC (e.g., which can employ the AI component, AI-based model, and/or AI-based technology) can predict or determine the second location that the vehicle is going to be at during the second time period based at least in part on the results of the analysis of the vehicle-related data associated with the vehicle. The second network equipment (e.g., a second RAN or a second base station of the first or second RAN) can be associated with the second location such that the second network equipment can be associated with a second coverage area where the second network equipment can be able to provide communication services to the communication device and/or other communication devices.

At 906, an amount of data to be communicated by a communication device associated with the vehicle to the backend server component can be determined based at least in part on data offloading-related information received from the communication device. The OMC can determine the amount of data (e.g., actual or approximated amount of data) to be communicated by the communication device to the backend server component based at least in part on the data offloading-related information received by the OMC from the communication device via the first network equipment (or other network equipment).

At 908, respective amounts of data that can be communicated (e.g., concurrently or simultaneously communicated) by the communication device to the second network equipment at the second location during the second time period via respective communication paths or connections associated with respective communication technologies can be determined based at least in part on conditions or characteristics associated with the second location, the second network equipment, the vehicle, and/or the communication device, historical conditions or characteristics associated therewith, and/or the amount of time that is going to be available to communicate data between the communication device and second network equipment. The OMC can predict or determine the respective amounts of the data that can be communicated (e.g., concurrently or simultaneously communicated) by the communication device to the second network equipment at the second location during the second time period via the respective communication paths or connections associated with the respective communication technologies (e.g., mmWave, sub-6 GHz, CBRS, or other type of wireless communication technology) based at least in part on the results of analyzing information relating to the conditions or the characteristics associated with the second location, the second network equipment, the vehicle, and/or the communication device, the historical conditions or characteristics associated therewith, and/or the amount of time (e.g., predicted, estimated, expected, or determined amount of time) that is going to be available to communicate data between the communication device and second network equipment, such as described herein. At this point, the method 900 can proceed to reference point A, wherein, as depicted in FIG. 10, the method 900 can continue from reference point A to reference numeral 910.

At 910, prior to the second time period, the offloader component of the communication device can be instructed to segment the data into respective segments of data of the respective amounts of data and associate respective unique identifiers with the respective segments of data. Based at least in part on the determining or predicting of the respective amounts of data that can be communicated by the communication device to the second network equipment at the second location during the second time period via the respective communication paths or connections associated with the respective communication technologies, the OMC can communicate instructions to the communication device (e.g., via a first or other network equipment), wherein the instructions can instruct the offloader component of the communication device to segment the data to form the respective segments of data and associate the respective unique identifiers with the respective segments of data.

At 912, the second network equipment can be instructed to authenticate the communication device prior to the communication device arriving at the second location during the second time period. The OMC can communicate instructions to the second network equipment, wherein the instructions can instruct the second network equipment to authenticate the communication device prior to the communication device arriving at the second location during the second time period. In response to such instructions, prior to second time period, the second network equipment can authenticate the communication device based at least in part on authentication information relating to the communication device that can be received from the first network equipment prior to the second time period, such as described herein.

At 914, prior to the second time period, the second network equipment can be instructed to provide a group of resources to the communication device associated with the vehicle during the second time period to facilitate communication of the respective segments of data to the second network equipment via the respective communication paths or connections associated with the respective communication technologies, and forwarding of the respective segments of data to the backend server component. The OMC can instruct the second network equipment to reserve, schedule, allocate, or otherwise provide the group of resources (e.g., a desired amount of resources, or all available resources associated with the second network equipment) to the communication device associated with the vehicle during the second time period to facilitate the communication of the respective segments (e.g., of respective amounts) of data to the second network equipment via the respective communication paths or connections associated with the respective communication technologies, and forwarding of the respective segments of data to the backend server component.

At 916, during the second time period (or at a time thereafter), the backend server component can receive the respective segments of data associated with the respective unique identifiers from the communication device via the second network equipment. For instance, during the second time period, the second network equipment can receive the respective segments of data associated with the respective unique identifiers from the communication device via the respective communication paths or connections associated with the respective communication technologies. The second network equipment can communicate the respective segments of data to the backend server component.

At 918, the respective segments of data can be arranged in a desired order based at least in part on the respective unique identifiers. For instance, the OMC can arrange the respective segments of data in the desired (e.g., specified) order, based at least in part on the respective unique identifiers, such that the respective segments of data can be in an order that can correspond to the data (e.g., the original data being sent by the communication device).

Figure 11:
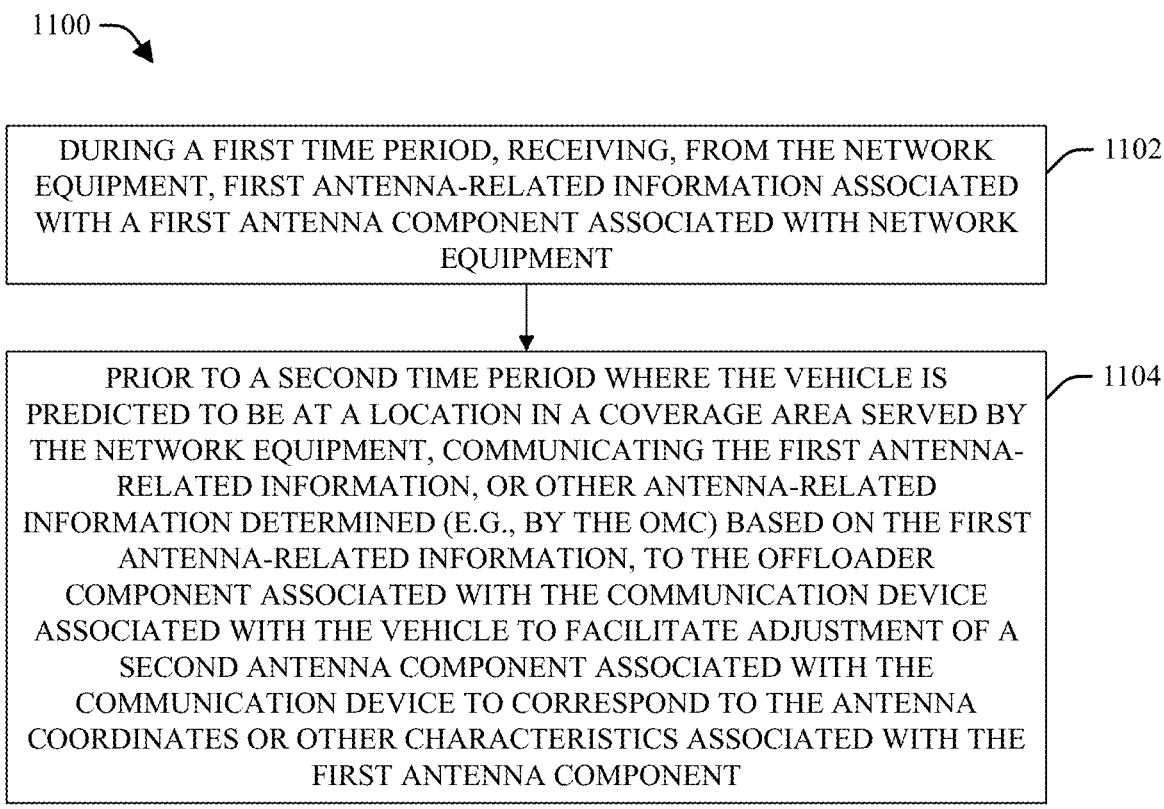
FIG. 11 illustrates a flow chart of an example method that can manage and/or coordinate adjustment of directions or coordinates of respective antennas associated with a RAN and a communication device associated with a vehicle to facilitate desirable communication (e.g., offloading) of data, in accordance with various aspects and embodiments of the disclosed subject matter.

FIG. 11 illustrates a flow chart of an example method 1100 that can manage and/or coordinate adjustment of directions or coordinates of respective antennas associated with a RAN and a communication device associated with a vehicle to facilitate desirable communication (e.g., offloading) of data, in accordance with various aspects and embodiments of the disclosed subject matter. The method 1100 can be employed by, for example, a system comprising the backend server component comprising the OMC, RANs comprising OPCs, communication device comprising an offloader component and associated with a vehicle, a processor component(s) (e.g., of or associated with the OMC, OPCs, and/or offloader component), and/or a data store (e.g., of or associated with the OMC, OPCs, and/or offloader component).

At 1102, during a first time period, first antenna-related information associated with a first antenna component associated with network equipment can be received by the OMC associated with a backend server component from the network equipment. During the first time period, the OMC can receive the first antenna-related information associated with the first antenna component from the network equipment (e.g., the OPC of or associated with the network equipment). The first antenna-related information can comprise or relate to coordinates and/or direction of the first antenna component associated with the network equipment, and/or other antenna characteristics (e.g., attributes, parameters, or specifications) associated with the first antenna component.

At 1104, prior to a second time period where the vehicle is predicted to be at a location in a coverage area served by the network equipment, the first antenna-related information, or other antenna-related information determined (e.g., by the OMC) based on the first antenna-related information, can be communicated to the offloader component associated with the communication device associated with the vehicle to facilitate adjustment of a second antenna component associated with the communication device to correspond to the antenna coordinates or other characteristics associated with the first antenna component. For instance, prior to the second time period (e.g., prior to the vehicle and associated communication device reaching the second location), the OMC can communicate the first antenna-related information, or other antenna-related information (e.g., antenna coordinates or other characteristics associated with the first antenna component) determined (e.g., by the OMC) based on the first antenna-related information, to the offloader component associated with the communication device.

During the second time period, to facilitate desirable communication of the data to the network equipment, the offloader component can adjust the coordinates or other characteristics associated with the second antenna component to correspond to the antenna coordinates or other characteristics associated with the first antenna component based at least in part on the first antenna-related information or the other antenna-related information. As the vehicle moves through the second location, the OPC associated with the network equipment can adjust or facilitate adjusting the coordinates or other characteristics associated with the first antenna component (e.g., adjust the direction of the antenna(s) of the first antenna component), and the offloader component associated with the communication device can adjust or facilitate adjusting the coordinates or other characteristics associated with the second antenna component (e.g., adjust the direction of the antenna(s) of the second antenna component), to facilitate enabling the communication device and the network equipment to achieve or maintain desirable (e.g., suitable, enhanced, or optimal) connectivity (e.g., wireless connectivity), communication speed, QoS, and/or other channel qualities associated with the communication connection(s) (e.g., wireless communication connection(s)) between the communication device and the network equipment.

Figure 12:
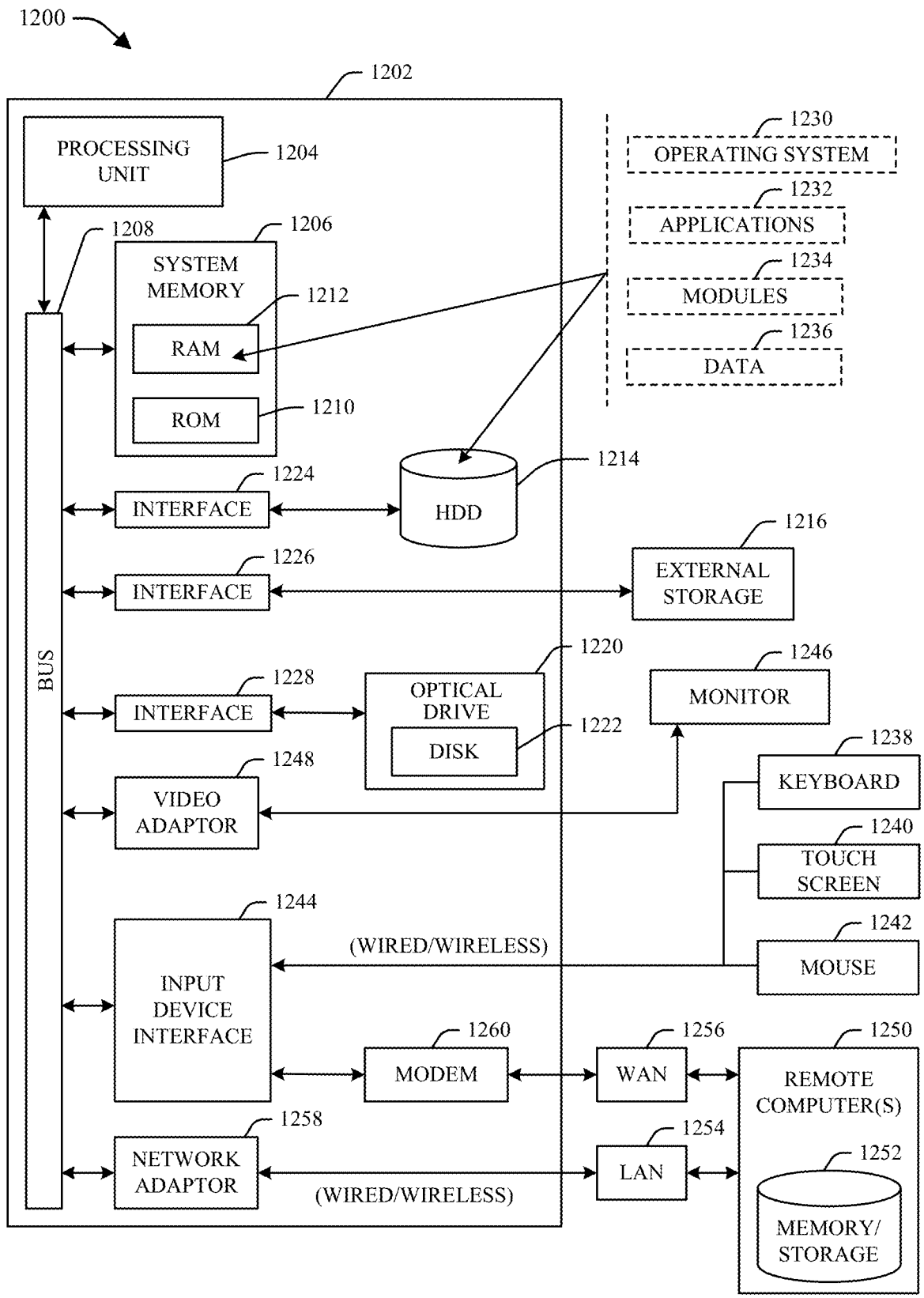
FIG. 12 is a schematic block diagram illustrating a suitable computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, or other type of storage device) and an optical disk drive 1220 (e.g., which can read or write from a CD-ROM disc, a DVD, a BD, or other disk drive). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH™ interface, or other type of interface.

A monitor 1246 or other type of display device can be also connected to the system bus 1208 via an interface, such as a video adapter 1248. In addition to the monitor 1246, a computer typically includes other peripheral output devices (not shown), such as speakers, printers, or other type of peripheral output device.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or nonvolatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, base station, cell, RAN, communication network, vehicle, OMC, OPC, offloader component, application, service, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
predicting, by a system comprising a processor, a second location of a vehicle at a second time based on a result of analyzing condition data indicative of a condition associated with the vehicle at a first time that is prior to the second time and location data indicative of a first location of the vehicle at the first time;
based on the predicting, and prior to the second time, instructing, by the system, network equipment to schedule a group of resources for use by a first device associated with the vehicle at the second time, wherein, based on the group of resources, the network equipment is able to provide a data communication service to the first device at the second location to enable receipt of data by a second device from the first device via the network equipment, wherein the condition is a first condition, wherein the condition data is first condition data;
from a group of communication technologies, determining, by the system, a communication technology of different technologies that is able to be utilized by the first device and the network equipment at the second time to facilitate communication of at least a portion of data from the first device to the network equipment, based on second condition data indicative of a second condition associated with the second location or historical information relating to data communications at or within a defined distance of the second location; and
instructing, by the system, the first device or the network equipment to utilize the communication technology to facilitate the communication of at least the portion of the data from the first device to the network equipment at the second time.

2. The method of claim 1, further comprising:
based on the predicting, instructing, by the system, the network equipment to authenticate the first device prior to the second time, wherein the network equipment is second network equipment, wherein, prior to the second time, the first device is authenticated by first network equipment associated with the first location based on first authentication information associated with the first device, and wherein, based on the predicting, and prior to the second time, the second network equipment authenticates the first device based on second authentication information associated with the first device and received from the first network equipment.

3. The method of claim 2, wherein the predicting is based on a machine learning model that learns to predict locations of vehicles, wherein the machine learning model learns to predict the locations of the vehicles based on historical condition data indicative of previous conditions associated with previous vehicles or training data relating to vehicle-related conditions.

4. The method of claim 1, wherein the condition associated with the vehicle relates to a speed of the vehicle, a direction in which the vehicle is determined to be traveling at the first time, a geometry associated with a travel path via which the vehicle is determined to be traveling, a vehicle traffic condition determined to be associated with the vehicle or the travel path, or an environmental condition determined to be associated with the vehicle or the travel path.

5. The method of claim 1, wherein the condition associated with the vehicle relates to an environmental condition determined to be associated with a coverage area of the network equipment.

6. The method of claim 1, further comprising:
instructing, by the system, the first device to communicate the data in respective data segments of respective segment sizes based on a time length of availability determined for the network equipment, wherein the respective data segments are associated with respective unique data segment identifiers.

7. The method of claim 6, wherein the respective data segments comprise a first data segment and a second data segment, and wherein the first data segment is communicated by the first device to the network equipment using a first communication technology concurrently with the second data segment being communicated by the first device to the network equipment using a second communication technology different than the first communication technology.

8. The method of claim 7, wherein the first communication technology is one communication technology of a group of communication technologies comprising millimeter wave technology, sub-6 gigahertz fifth generation technology, and citizens broadband radio service technology, and
wherein the second communication technology is a different communication technology of the group of communication technologies than the first communication technology.

9. The method of claim 6, further comprising:
at or subsequent to the second time, receiving, by the system, the respective data segments from the network equipment; and
arranging, by the system, the respective data segments in a defined order, based on the respective unique identifiers, to form a data chunk of the data.

10. The method of claim 1, further comprising:
instructing, by the system, the first device to adjust a speed of the vehicle at the second location to adjust an amount of time that the first device is able to communicate the data to the network equipment.

11. The method of claim 1, further comprising:
determining, by the system, first coordinates associated with a first direction of a first antenna associated with the network equipment based on first coordinate data associated with the network equipment; and
communicating, by the system, information relating to the first coordinates to the first device to facilitate adjustment of second coordinates associated with a second direction of a second antenna associated with the first device to orient the second direction of the second antenna to correspond to the first direction of the first antenna while the vehicle and the first device are at the second location, in accordance with a defined data communication criterion.

12. A system, comprising:
a processor; and
a memory that stores executable instructions that, when executed by the processor, facilitate performance of operations, comprising:
predicting a second location of a user equipment associated with a vehicle at a second time based on a result of analyzing condition information relating to a condition associated with the vehicle at a first time that is prior to the second time and location information indicating a first location of the user equipment at the first time; and
based on the predicting, and prior to the second time, directing network equipment to reserve a group of resources for use by a user equipment associated with the vehicle at the second time, wherein, based on the group of resources, the network equipment is able to provide an information communication service to the user equipment at the second location to enable receipt of information by a device from the user equipment via the network equipment; and
directing the user equipment to modify a velocity of the vehicle at the second location to modify an amount of time that the user equipment has available to communicate information to the network equipment.

13. The system of claim 12, wherein the operations further comprise:
based on the predicting, directing the network equipment to authenticate the user equipment prior to the second time.

14. The system of claim 13, wherein the network equipment is second network equipment, wherein, prior to the second time, the user equipment is authenticated by first network equipment associated with the first location based on first authentication information associated with the user equipment, and wherein, based on the predicting, and prior to the second time, the second network equipment authenticates the user equipment based on second authentication information associated with the user equipment and received from the first network equipment.

15. The system of claim 12, wherein the condition associated with the vehicle relates to a velocity of the vehicle, a direction in which the vehicle is determined to be traveling at the first time, a geographical arrangement of a travel path via which the vehicle is determined to be traveling, a vehicle traffic condition determined to be associated with the vehicle or the travel path, or an environmental condition determined to be associated with the vehicle or the travel path.

16. The system of claim 12, wherein the operations further comprise:
at the second time, receiving, by the device, the information from the user equipment via the network equipment.

17. The system of claim 12, wherein the operations further comprise:
directing the user equipment to communicate data in respective data segments of respective segment sizes based on a time length of availability determined for the network equipment, wherein the respective data segments are associated with respective unique data segment identifiers.

18. The system of claim 12, wherein the network equipment is first network equipment, and wherein the operations further comprise:

registering a user identity or the user equipment associated with the user identity with an information offloading service;

generating a policy profile, comprising profile information, associated with the user identity, the user equipment, or the vehicle; and from a group of network equipment, comprising the first network equipment and second equipment, and based on analysis of respective functionality of respective network equipment of the group of network equipment, determining a subgroup of the group of network equipment, comprising the first network equipment, that comprises a function that is able to be utilized to facilitate providing the information offloading service to the user equipment.

19. A non-transitory machine-readable medium, comprising executable instructions that, when executed by a processor, facilitate performance of operations, comprising:

receiving, from a first device, a directive to control radio access network equipment, associated with a second location, to reserve a group of resources for use by a second device associated with a vehicle at the second location during a second time period, wherein the second location of the vehicle during the second time period is projected based on condition data relating to a condition associated with the vehicle during a first time period that is prior to the second time period and location data indicative of a first location of the vehicle during the first time period;

in response to the directive, scheduling the group of resources associated with the radio access network equipment for use by the second device at the second location during the second time period, wherein, based on the group of resources, the radio access network equipment is able to provide a data communication service to the second device at the second location to enable communication of data by the second device to the first device via the radio access network equipment;

instructing the first device to communicate data in respective data segments of respective segment sizes based on a time length of availability determined for the radio access network equipment, wherein the respective data segments are associated with respective unique data segment identifiers.

20. The non-transitory machine-readable medium of claim 19, wherein the radio access network equipment is second radio access network equipment, wherein, before the second time period, the second device is authenticated by first radio access network equipment associated with the first location based on first authentication information associated with the second device, and wherein the operations further comprise:

before the second time period:

receiving second authentication information associated with the second device from the first radio access network equipment, and authenticating the second device based on the second authentication information;

during the second time period, receiving the data from the second device based on the group of resources; and communicating the data to the first device.

\* \* \* \* \*